US010770072B2

(12) United States Patent
Costa Villas Bôas Segura et al.

(10) Patent No.: US 10,770,072 B2
(45) Date of Patent: Sep. 8, 2020

(54) COGNITIVE TRIGGERING OF HUMAN INTERACTION STRATEGIES TO FACILITATE COLLABORATION, PRODUCTIVITY, AND LEARNING

(71) Applicant: International Business Machines Corporation, Armonk, NY (US)

(72) Inventors: Vinícius Costa Villas Bôas Segura, Rio de Janeiro (BR); Ana Fucs, Rio de Janeiro (BR); Rodrigo Laiola Guimaraes, Vitoria (BR); Julio Nogima, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 16/214,696

(22) Filed: Dec. 10, 2018

(65) Prior Publication Data
US 2020/0184965 A1  Jun. 11, 2020

(51) Int. Cl.
*G10L 15/22* (2006.01)
*G10L 15/18* (2013.01)
(Continued)

(52) U.S. Cl.
CPC .............. *G10L 15/22* (2013.01); *G06N 20/00* (2019.01); *G10L 15/02* (2013.01);
(Continued)

(58) Field of Classification Search
CPC ................. H04L 12/1822; H04L 12/1818
See application file for complete search history.

(56) References Cited

U.S. PATENT DOCUMENTS 5,086,394 A   2/1992  Shapira
5,109,789 A   5/1992  Berman
(Continued)

FOREIGN PATENT DOCUMENTS

| AU | 2007327315 B2 | 7/2013 |
| CN | 103269349 A | 8/2013 |
| WO | 2000062266 A1 | 10/2000 |
| WO | 2001031537 A2 | 5/2001 |
| WO | 2005013969 A1 | 2/2005 |

OTHER PUBLICATIONS

Berg, "Modelling of Natural Dialogues in the Context of Speech-based Information and Control Systems," Dissertations in Database and Information Systems, 2014, PhD Dissertation, 250 pages.
(Continued)

*Primary Examiner* — Samuel G Neway
(74) *Attorney, Agent, or Firm* — Cantor Colburn LLP; Joseph Petrokaitis

(57) ABSTRACT

Embodiments are directed to a computer-implemented method that includes receiving, at a triggering system, input data about an environment. Machine learning (ML) algorithms extract features from the input data and analyze relationships among and between the features to generate user-interaction-readiness model of person-A's readiness to participate in a human interaction with other persons in the environment. The ML algorithms to apply real-world data about person-A to the user-interaction-readiness model to generate a first classification output comprising data representing person-A's readiness to participate in a human interaction with other persons in the environment. Based at least in part on a determination that person-A and another person(s) in the environment are interaction candidates, the triggering system triggers the initiation of human interaction strategies configured to facilitate human interactions between person-A and the previously identified another person(s) in the environment.

20 Claims, 13 Drawing Sheets

(51) Int. Cl.
  *G06N 20/00* (2019.01)
  *G10L 15/02* (2006.01)
  *H04L 12/18* (2006.01)
  *G10L 13/04* (2013.01)
  *G10L 15/08* (2006.01)

(52) U.S. Cl.
  CPC ...... *G10L 15/1815* (2013.01); *H04L 12/1818* (2013.01); *H04L 12/1822* (2013.01); *G10L 13/043* (2013.01); *G10L 2015/088* (2013.01)

(56) References Cited

U.S. PATENT DOCUMENTS

| | | | |
|---|---|---|---|
| 5,208,748 | A | 5/1993 | Flores et al. |
| 5,596,634 | A | 1/1997 | Fernandez et al. |
| 5,948,054 | A | 9/1999 | Nielsen |
| 6,023,729 | A * | 2/2000 | Samuel .................. G06Q 30/02 463/42 |
| 6,219,643 | B1 | 4/2001 | Cohen et al. |
| 6,246,981 | B1 | 6/2001 | Papineni et al. |
| 6,330,539 | B1 | 12/2001 | Takayama et al. |
| 6,334,103 | B1 | 12/2001 | Surace et al. |
| 6,464,222 | B1 | 10/2002 | Parker |
| 6,466,654 | B1 | 10/2002 | Cooper et al. |
| 6,504,920 | B1 | 1/2003 | Okon et al. |
| 6,539,232 | B2 | 3/2003 | Hendrey et al. |
| 6,542,749 | B2 | 4/2003 | Tanaka et al. |
| 6,542,750 | B2 | 4/2003 | Hendrey et al. |
| 6,594,693 | B1 | 7/2003 | Borwankar et al. |
| 6,641,481 | B1 | 11/2003 | Mai et al. |
| 6,651,086 | B1 * | 11/2003 | Manber ............... H04L 12/1822 707/999.102 |
| 6,665,644 | B1 | 12/2003 | Kanevsky et al. |
| 6,721,706 | B1 | 4/2004 | Strubbe et al. |
| 6,727,916 | B1 | 4/2004 | Ballard |
| 6,731,307 | B1 | 5/2004 | Strubbe et al. |
| 6,751,597 | B1 | 6/2004 | Brodsky et al. |
| 6,757,362 | B1 | 6/2004 | Cooper et al. |
| 6,829,603 | B1 | 12/2004 | Chai et al. |
| 6,839,669 | B1 | 1/2005 | Gould et al. |
| 6,964,023 | B2 | 11/2005 | Maes et al. |
| 7,085,806 | B1 | 8/2006 | Shapira |
| 7,093,832 | B2 | 8/2006 | Parker |
| 7,137,126 | B1 | 11/2006 | Coffman et al. |
| 7,142,642 | B2 | 11/2006 | McClelland et al. |
| 7,330,845 | B2 | 2/2008 | Lee et al. |
| 7,487,095 | B2 | 2/2009 | Hill et al. |
| 7,493,369 | B2 | 2/2009 | Horvitz et al. |
| 7,603,413 | B1 | 10/2009 | Herold et al. |
| 7,614,955 | B2 | 11/2009 | Farnham et al. |
| 7,762,665 | B2 | 7/2010 | Vertegaal |
| 7,769,705 | B1 | 8/2010 | Luechtefeld |
| 7,813,917 | B2 | 10/2010 | Shuster |
| D646,329 | S | 10/2011 | Lawrence et al. |
| 8,069,131 | B1 | 11/2011 | Luechtefeld et al. |
| 8,073,681 | B2 | 12/2011 | Baldwin et al. |
| 8,296,152 | B2 | 10/2012 | Issa et al. |
| 8,539,359 | B2 | 9/2013 | Rapaport et al. |
| 8,700,644 | B1 | 4/2014 | Allen et al. |
| 8,764,567 | B2 | 7/2014 | Smith et al. |
| 8,825,802 | B2 | 9/2014 | Pearce |
| 9,292,880 | B1 | 3/2016 | Koorakula et al. |
| 9,344,518 | B2 | 5/2016 | Kau et al. |
| 9,375,641 | B2 | 6/2016 | Shaw et al. |
| 9,697,501 | B2 | 7/2017 | Ramanathan |
| 9,742,909 | B2 | 8/2017 | Chau et al. |
| 2002/0083167 | A1 | 6/2002 | Costigan et al. |
| 2002/0108125 | A1 | 8/2002 | Joao |
| 2002/0160339 | A1 | 10/2002 | King et al. |
| 2002/0163572 | A1 * | 11/2002 | Center, Jr. ........ H04N 21/44218 348/14.08 |
| 2003/0023435 | A1 | 1/2003 | Josephson |
| 2003/0043194 | A1 | 3/2003 | Lif |
| 2003/0101151 | A1 | 5/2003 | Holland |
| 2003/0207237 | A1 | 11/2003 | Glezerman |
| 2004/0014486 | A1 | 1/2004 | Carlton et al. |
| 2004/0203363 | A1 | 10/2004 | Carlton et al. |
| 2004/0210159 | A1 | 10/2004 | Kibar |
| 2004/0215756 | A1 | 10/2004 | Vanantwerp et al. |
| 2005/0049908 | A2 | 3/2005 | Hawks |
| 2005/0084082 | A1 | 4/2005 | Horvitz et al. |
| 2005/0177405 | A1 | 8/2005 | Turner |
| 2006/0010240 | A1 | 1/2006 | Chuah |
| 2006/0059160 | A1 | 3/2006 | Smola et al. |
| 2006/0176831 | A1 | 8/2006 | Greenberg et al. |
| 2006/0210125 | A1 | 9/2006 | Heisele |
| 2006/0242101 | A1 | 10/2006 | Akkiraju et al. |
| 2007/0027889 | A1 | 2/2007 | Kaufman |
| 2007/0162569 | A1 | 7/2007 | Robinson et al. |
| 2007/0189520 | A1 | 8/2007 | Altberg et al. |
| 2007/0213046 | A1 | 9/2007 | Li et al. |
| 2007/0226296 | A1 | 9/2007 | Lowrance et al. |
| 2008/0084984 | A1 * | 4/2008 | Levy ................... H04L 12/1818 379/202.01 |
| 2008/0126426 | A1 | 5/2008 | Manas et al. |
| 2008/0147487 | A1 | 6/2008 | Hirshberg |
| 2008/0147743 | A1 | 6/2008 | Taylor et al. |
| 2008/0222535 | A1 * | 9/2008 | Zrike ................... G06Q 10/107 715/751 |
| 2008/0263458 | A1 | 10/2008 | Altberg et al. |
| 2008/0275701 | A1 | 11/2008 | Wu et al. |
| 2009/0094048 | A1 | 4/2009 | Wallace et al. |
| 2009/0119173 | A1 | 5/2009 | Parsons et al. |
| 2009/0158171 | A1 | 6/2009 | Cheng et al. |
| 2009/0204465 | A1 | 8/2009 | Pradhan |
| 2009/0258336 | A1 | 10/2009 | Foote |
| 2009/0265245 | A1 | 10/2009 | Wright |
| 2009/0292526 | A1 | 11/2009 | Harari et al. |
| 2009/0306981 | A1 | 12/2009 | Cromack et al. |
| 2009/0307325 | A1 | 12/2009 | Szeto |
| 2009/0319917 | A1 | 12/2009 | Fuchs et al. |
| 2009/0325712 | A1 | 12/2009 | Rance |
| 2010/0217808 | A1 | 8/2010 | Benninger |
| 2010/0325107 | A1 | 12/2010 | Kenton et al. |
| 2011/0191352 | A1 | 8/2011 | Jones et al. |
| 2011/0320373 | A1 | 12/2011 | Lee et al. |
| 2012/0058455 | A1 | 3/2012 | Lawrence et al. |
| 2012/0226997 | A1 | 9/2012 | Pang |
| 2012/0232989 | A1 | 9/2012 | Musgrove |
| 2012/0302332 | A1 | 11/2012 | Buhr |
| 2012/0311032 | A1 | 12/2012 | Murphy et al. |
| 2013/0185368 | A1 * | 7/2013 | Nordstrom ............ H04W 4/023 709/206 |
| 2013/0203475 | A1 | 8/2013 | Kil et al. |
| 2014/0004486 | A1 | 1/2014 | Crawford et al. |
| 2014/0065591 | A1 | 3/2014 | Tulgan et al. |
| 2014/0074629 | A1 | 3/2014 | Rathod |
| 2014/0223462 | A1 * | 8/2014 | Aimone ............ H04N 21/4788 725/10 |
| 2014/0267540 | A1 * | 9/2014 | Torgersrud ........ H04M 3/42374 348/14.01 |
| 2014/0314225 | A1 | 10/2014 | Riahi et al. |
| 2014/0351352 | A1 | 11/2014 | Degaugue et al. |
| 2015/0156268 | A1 | 6/2015 | Lev et al. |
| 2015/0163262 | A1 * | 6/2015 | Bank ................... H04L 65/1069 709/204 |
| 2015/0172462 | A1 | 6/2015 | Cudak et al. |
| 2015/0334140 | A1 * | 11/2015 | Singh ................... G06F 3/0481 709/204 |
| 2016/0164813 | A1 | 6/2016 | Anderson et al. |
| 2017/0069039 | A1 | 3/2017 | Kennewick et al. |
| 2018/0189398 | A1 | 7/2018 | Sternberg et al. |
| 2018/0190143 | A1 | 7/2018 | Corelli et al. |
| 2018/0190144 | A1 | 7/2018 | Corelli et al. |

OTHER PUBLICATIONS

List of IBM Patents or Patent Applications Treated As Related; Date Filed: Dec. 10, 2018, 2 pages.

* cited by examiner

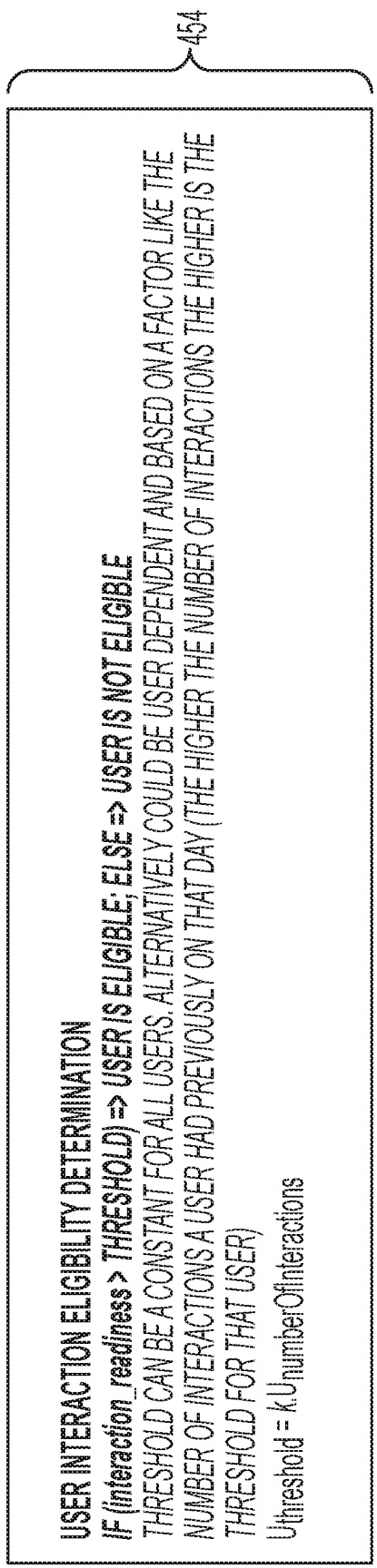

USER INTERACTION ELIGIBILITY DETERMINATION
IF (interaction_readiness > THRESHOLD) => USER IS ELIGIBLE; ELSE => USER IS NOT ELIGIBLE
THRESHOLD CAN BE A CONSTANT FOR ALL USERS. ALTERNATIVELY COULD BE USER DEPENDENT AND BASED ON A FACTOR LIKE THE NUMBER OF INTERACTIONS A USER HAD PREVIOUSLY ON THAT DAY (THE HIGHER THE NUMBER OF INTERACTIONS THE HIGHER IS THE THRESHOLD FOR THAT USER)
Uthreshold = K.U.numberOfInteractions

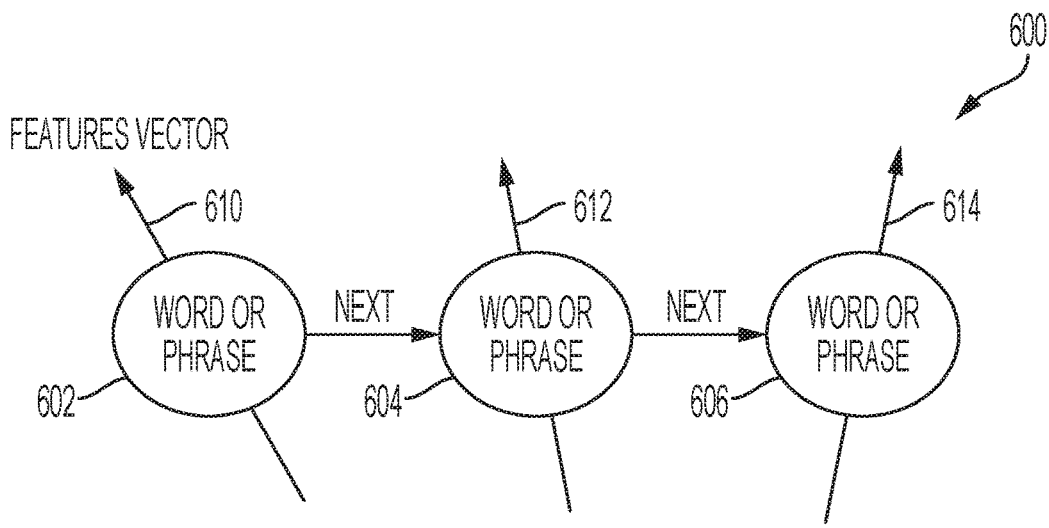
FIG. 6A
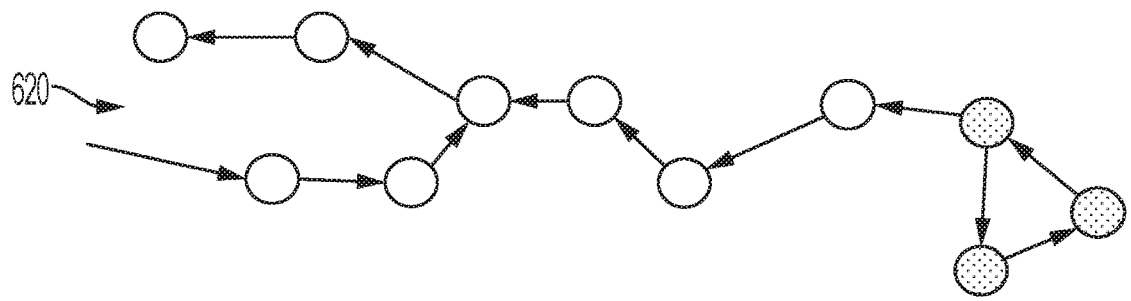
FIG. 6B
| | |
|---|---|
| $(0,1,0,0...)$ | VECTOR A |
| $sim(a,b) = W_a \cdot W_b$ | EQUATION B |
| $G = \{N,E,W\}$ | EQUATION C |
| $W = W_{syn} \oplus W_{sem} \oplus W_{ntxt}$ | EQUATION D |
| $G_{sk} = \{N,E\}$ | EQUATION E |
| $H = \sum_n E_{nm} W_n W_m$ | EQUATION F |
| $M = M(F_{brain}, C_{brain})$ | EQUATION G |
| $C(sample) = M(F_{sample})$ | EQUATION H |
FIG. 7

US 10,770,072 B2

COGNITIVE TRIGGERING OF HUMAN INTERACTION STRATEGIES TO FACILITATE COLLABORATION, PRODUCTIVITY, AND LEARNING

BACKGROUND

The present invention relates in general to computing devices. More specifically, the present invention relates to computing systems, computer-implemented methods, and computer program products that cognitively trigger computer-implemented human interaction strategies to facilitate collaboration, productivity, and learning.

A dialogue system or conversational agent (CA) is a computer system configured to communicate with a human using a coherent structure. Dialogue systems can employ a variety of communication mechanisms, including, for example, text, speech, graphics, haptics, gestures, and the like for communication on both the input and output channels. Dialogue systems can employ various forms of natural language processing (NLP), which is a field of computer science, artificial intelligence, and computational linguistics concerned with the interactions between computers and humans using language. Among the challenges in implementing NLP systems is enabling computers to derive meaning from NL inputs, as well as the effective and efficient generation of NL outputs.

SUMMARY

Embodiments are directed to a computer-implemented method of triggering a dialogue system to implement human interaction strategies configured to facilitate human interactions between and among selected persons in an environment. A non-limiting example of the method includes receiving, at a triggering system, input data about the environment. The machine learning (ML) algorithms of the triggering system are used to extract features from the input data. The ML algorithms of the triggering system are used to analyze relationships among and between the features extracted from the input data to generate a person-A user-interaction-readiness model for person-A in the environment, wherein the person-A user-interaction-readiness model includes a model of person-A's readiness to participate in a human interaction with other persons in the environment. The ML algorithms are used to apply real-world data about person-A to the person-A user-interaction-readiness model to generate a first classification output including data representing person-A's readiness to participate in a human interaction with other persons in the environment. The ML algorithms of the triggering system are used to analyze relationships among and between the features extracted from the input data to generate a person-B user-interaction-readiness model for person-B in the environment, wherein the person-B user-interaction-readiness model includes a model that indicates person-B's readiness to participate in a human interaction with another person in the environment. The ML algorithms are used to apply real-world data about person-B to the person-B user-interaction-readiness model to generate a second classification output that includes data representing person-B's readiness to participate in a human interaction with other persons in the environment. The ML algorithms of the triggering system are used to extract features from the input data, the first classification output, and the second classification output. The ML algorithms of the triggering system are used to analyze relationships among and between the features extracted from the input data, the first classification output, and the second classification output to generate a user-interaction-candidates group model for person-A and person-B in the environment, wherein the user-interaction-candidates group model includes a model of person-A's and Person B's readiness to participate in a human interaction that includes person-A and person-B. The ML algorithms are used to apply real-world data about person-A and person-B to the user-interaction-candidates group model to generate a third classification output that includes data representing person-A's readiness to participate in a human interaction with person-B in the environment, as well as person-B's readiness to participate in a human interaction with person-A. Based at least in part on the third classification output, the dialogue system triggers the implementation of human interaction strategies configured to facilitate human interactions between person-A and person-B in the environment.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 4C depicts a diagram illustrating a method of determining a user's interaction eligibility in accordance with the methodology shown in FIG. 4A;

FIG. 6A depicts a graphical text analyzer's output feature vector that includes an ordered set of words or phrases, wherein each is represented by its own vector according to embodiments of the invention;

FIG. 6B depicts a graph of communications according to embodiments of the invention;

FIG. 7 depicts a vector and various equations illustrating a core algorithm of a graphical text analyzer in accordance with embodiments of the invention;

Figure 1:
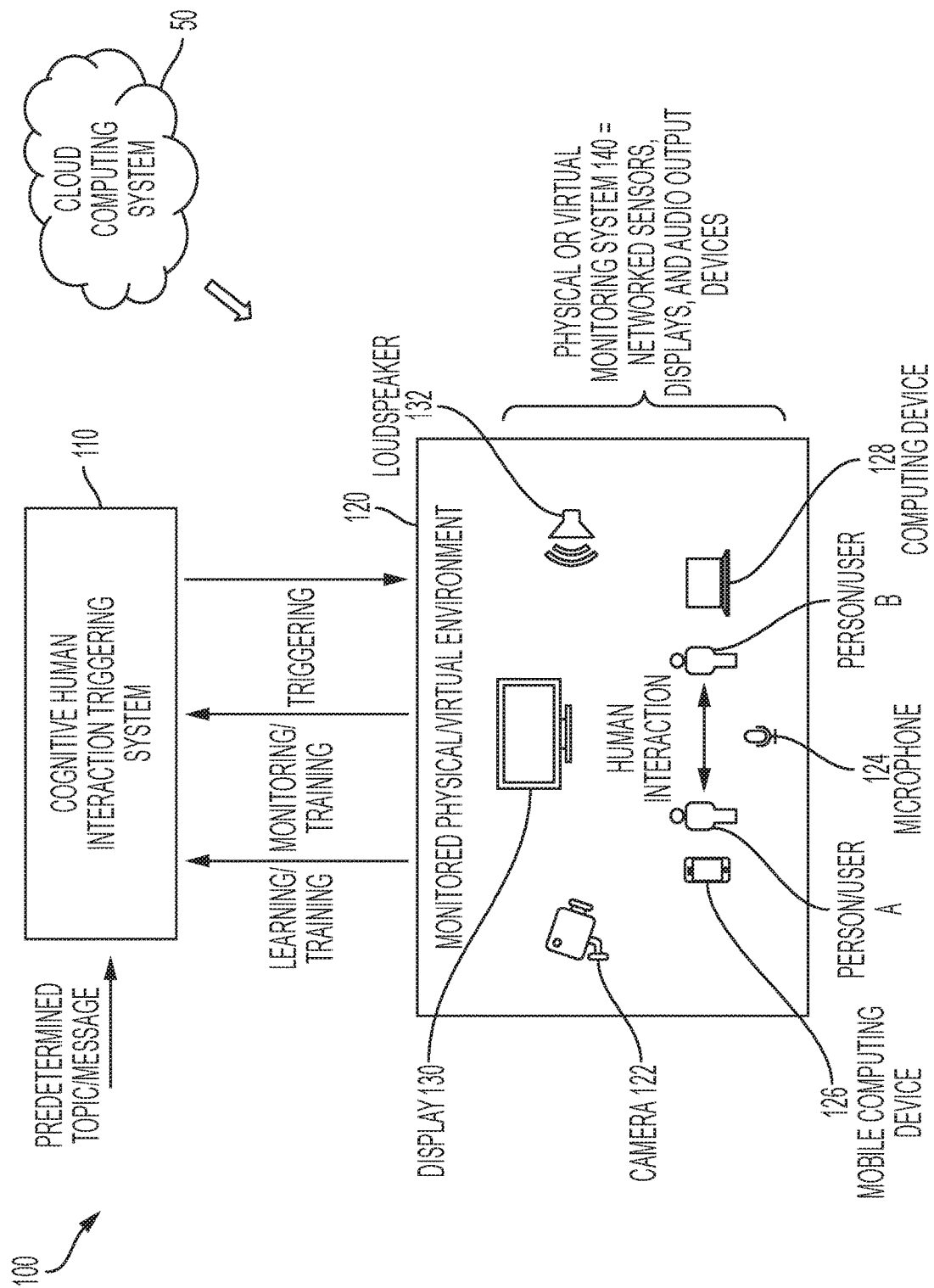
FIG. 1 depicts a block diagram illustrating a system according to embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As used herein, in the context of machine learning algorithms, the terms "input data," and variations thereof are intended to cover any type of data or other information that is received at and used by the machine learning algorithm to perform training, learning, and/or classification operations.

As used herein, in the context of machine learning algorithms, the terms "training data," and variations thereof are intended to cover any type of data or other information that is received at and used by the machine learning algorithm to perform training and/or learning operations.

As used herein, in the context of machine learning algorithms, the terms "application data," "real world data," "actual data," and variations thereof are intended to cover any type of data or other information that is received at and used by the machine learning algorithm to perform classification operations.

As used herein, the terms "physical environment" and variations thereof are intended to identify a particular set of tangible natural surroundings that can be occupied by persons, including, for example, land, air, water, plants, buildings, general building/structural infrastructure, and the like. A physical environment can also include other objects or entities in the natural surroundings that constitute the physical environment.

As used herein, the terms "virtual environment" and variations thereof are intended to identify a particular set of audio and/or video communications infrastructure that allows persons to communicate and interact with one another teleconferencing systems, videoconferencing systems, web conferencing systems, and the like.

As used herein, the terms "emotional state" and variations thereof are intended to identify a mental state or feeling that arises spontaneously rather than through conscious effort and is often accompanied by physiological changes. Examples of emotional states include feelings of joy, sorrow, anger, and the like.

As used herein, the terms "cognitive trait," "personality trait," and variations thereof are intended to identify generally accepted personality traits in psychology, which include but are not limited to the big five personality traits and their facets or sub-dimensions, as well as the personality traits defined by other models such as Kotler's and Ford's Needs Model and Schwartz's Values Model. The terms personality trait and/or cognitive trait identify a representation of measures of a user's total behavior over some period of time (including musculoskeletal gestures, speech gestures, eye movements, internal physiological changes, measured by imaging devices, microphones, physiological and kinematic sensors in a high dimensional measurement space) within a lower dimensional feature space. Embodiments of the invention use certain feature extraction techniques for identifying certain personality/cognitive traits. Specifically, the reduction of a set of behavioral measures over some period of time to a set of feature nodes and vectors, corresponding to the behavioral measures' representations in the lower dimensional feature space, is used to identify the emergence of a certain personality/cognitive trait over that period of time. The relationship of one feature node to other similar nodes through edges in a graph corresponds to the temporal order of transitions from one set of measures and the feature nodes and vectors to another. Some connected subgraphs of the feature nodes are herein defined as a personality/cognitive trait. Embodiments of the invention describe the analysis, categorization, and identification of these personality/cognitive traits by means of further feature analysis of subgraphs, including dimensionality reduction of the subgraphs, for example by means of graphical analysis, which extracts topological features and categorizes the resultant subgraph and its associated feature nodes and edges within a subgraph feature space.

Turning now to an overview of aspects of the invention, embodiments of the invention provide a computer-based cognitive system with voice-oriented dialog capabilities. The cognitive system uses machine learning techniques to facilitate human-human socialization and sharing experiences (e.g., social learning) to enhance, for instance, well being and users' knowledge sharing about a certain (predefined or computationally-defined) topic (or topics) of interest. Embodiments of the cognitive system take into account several inputs that specify users' context such as emotional state, cognitive traits, knowledge level and availability to engage in a face-to-face conversation.

Embodiments of the invention can be implemented as a dialog system configured in accordance with aspects of the invention to utilize cognitive computing to encourage interaction between humans within a common (virtual or physical) space. Based at least in part on a cognitive, machine learning-based determination by the system about the emotional state (and/or the cognitive traits) and schedule information of multiple users, an availability of each user can be determined. In response to identifying that at least two users have availability above a threshold, a suggested conversation topic is determined based on a machine-learning analysis of personal profiles and social media information of each user. A recommendation is provided to each user indicating the presence of the other user and the suggested conversation topic. The cognitive system is further configured to monitor the interaction and feedback learning to the machine learning algorithms of the cognitive system.

Embodiments of the invention increase the level of socialization and communication between users that share the same location (physical or virtual) in a certain point in time. Embodiment of the invention could be particularly useful for computational cognitive agents to help break the ice between users that had no previous interaction/conversation or as a mean to match common interests in a certain topic or area of expertise at a given moment.

Turning now to a more detailed description of the aspects of the present invention, FIG. 1 depicts a diagram illustrating a system 100 according to embodiments of the invention.

Figure 2A:
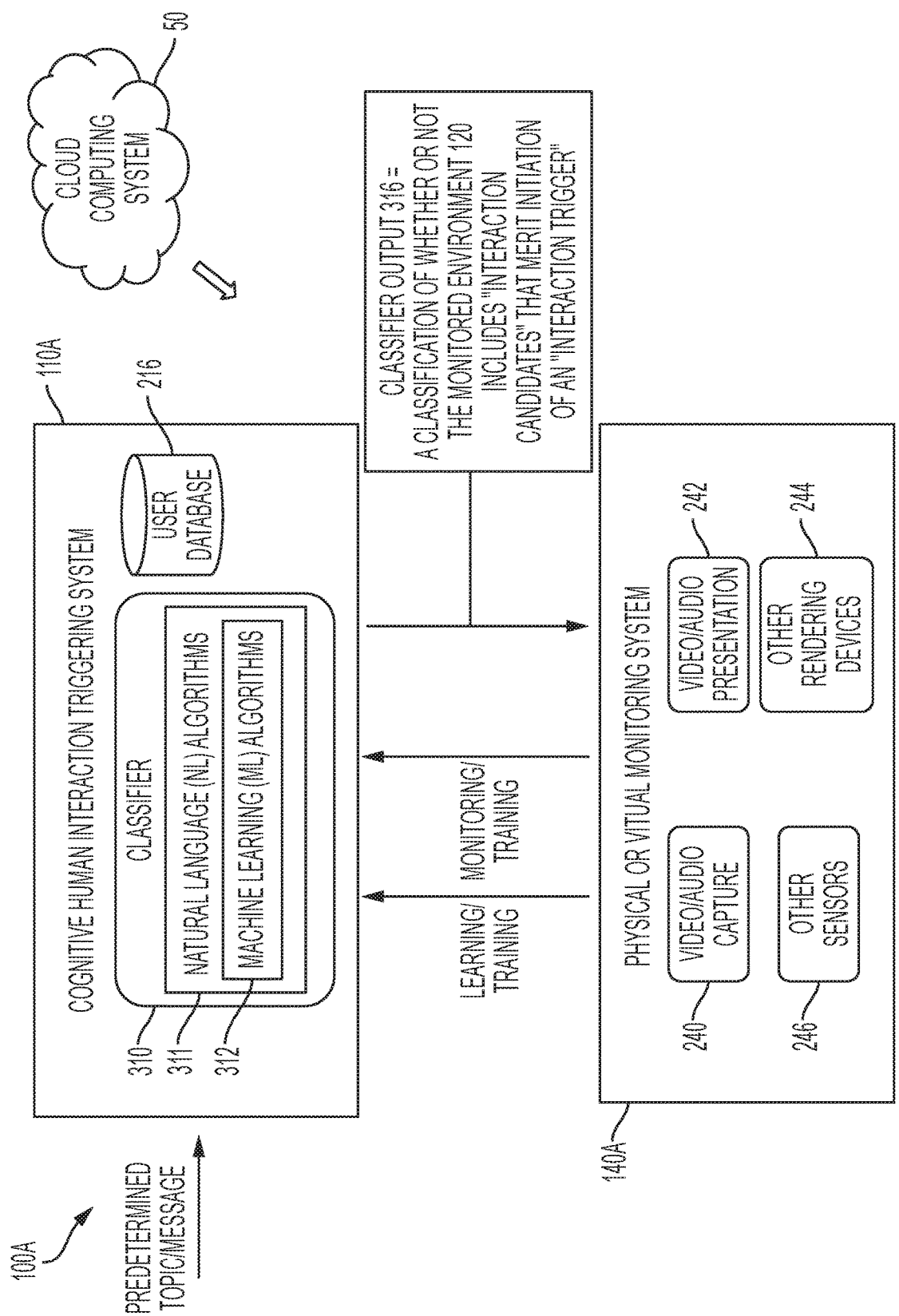
FIG. 2A depicts a block diagram illustrating a more detailed example of a system according to embodiments of the invention.

The system 100 includes a computer-based cognitive human interaction triggering system 110 in wired or wireless communication with a physical or virtual monitoring system 140. The monitoring system 140 is configured and arranged to monitor an environment 120, which can be a physical environment, a virtual environment, and/or a combination physical/virtual environment. In embodiments of the invention, any reference to an "environment" includes both physical and virtual embodiments. In general, a component/element of a physical environment will have a corresponding component/element in a virtual environment. In embodiments of the invention, any features or function of the monitoring system 140 (or 140A shown in FIGS. 2A and 3) and/or the triggering system 110 (or 110A shown in FIG. 2A, or 110B shown in FIG. 3) described herein as taking place in a physical environment applies equally to a corresponding feature or function of the monitoring system 140 (or 140A) or the triggering system 110 (or 110A, 110B) operating in a corresponding component/element of a virtual environment. For example, a speaker that emits an audio message to two persons in a kitchen of a monitored physical environment would correspond to a private (audio/video/text) message sent to the screens of two persons participating in meeting through a virtual environment. In accordance with aspects of the invention, the environment 120 can be any suitable environment (e.g., a workplace) in which it is desirable to identify candidates (e.g., Person/User A, Person/User B) for participation in a human interaction to thereby facilitate collaboration, productivity, and learning. In embodiments of the invention, the physical or virtual monitoring system 140 includes networked sensors (e.g., camera 122, microphone 124, mobile computing device 126, computing device 128), displays (e.g., display 130), and audio output devices (e.g., loudspeakers 132, mobile computing device 126, computing device 128) configured and arranged to interact with and monitor the activities of persons/users (e.g., Person/User A, Person/User B) within the monitored environment 120 to generate and transmit data (e.g., monitoring data, training data, learning data, etc.) about the environment 120 to the cognitive human interaction triggering system 110. In embodiment of the invention where the environment 120 is a virtual environment, the components of the monitoring system 140 can be incorporated within the components/elements of the virtual environment.

The system 100, and more specifically the cognitive human interaction triggering system 110, can be implemented as a programmable computer (e.g., computing system 1100 shown in FIG. 11) that includes algorithms configured and arranged to carry out certain dynamic and cognitive methodologies in accordance with aspects of the invention. More specifically, the triggering system 110 includes algorithms (e.g., machine learning (ML) algorithms 312 shown in FIG. 3A) configured to make cognitive determinations about whether or not users/persons (e.g., Person/User A, Person/User B) in the monitored environment 120 are human-interaction candidates based at least in part on ML analysis of the monitoring/training/learning data received at the triggering system 110 from the monitoring system 140. The ML algorithms of the triggering system 110 are further configured to, based at least in part on having determined that certain users/persons (e.g., Person/User A, Person/User B) in the monitored environment 120 are human-interaction candidates, trigger the execution of human-interaction strategies targeted to and tailored for the identified human-interaction candidates. The triggering system 110 monitors the successfulness of the executed human-interaction strategies and provides the results of monitoring the executed human interaction strategies as additional training/learning data for the ML algorithms of the triggering system 110.

A cloud computing system 50 (also shown in FIG. 9) is in wired or wireless electronic communication with the system 100. The cloud computing system 50 can supplement, support or replace some or all of the functionality of the cognitive human interaction triggering system 110 and the physical or virtual monitoring system 140. Additionally, some or all of the functionality of the cognitive human interaction triggering system 110 and the physical or virtual monitoring system 140 can be implemented as a node 10 (shown in FIGS. 9 and 10) of the cloud computing system 50. Additionally, in some embodiments of the invention, some or all of the functionality described herein as being executed by the triggering system 110 can be distributed among any of the devices of the monitoring system 140 that have sufficient processor and storage capability (e.g., mobile computing device 126, computing device 128) to execute the functionality.

Figure 2B:
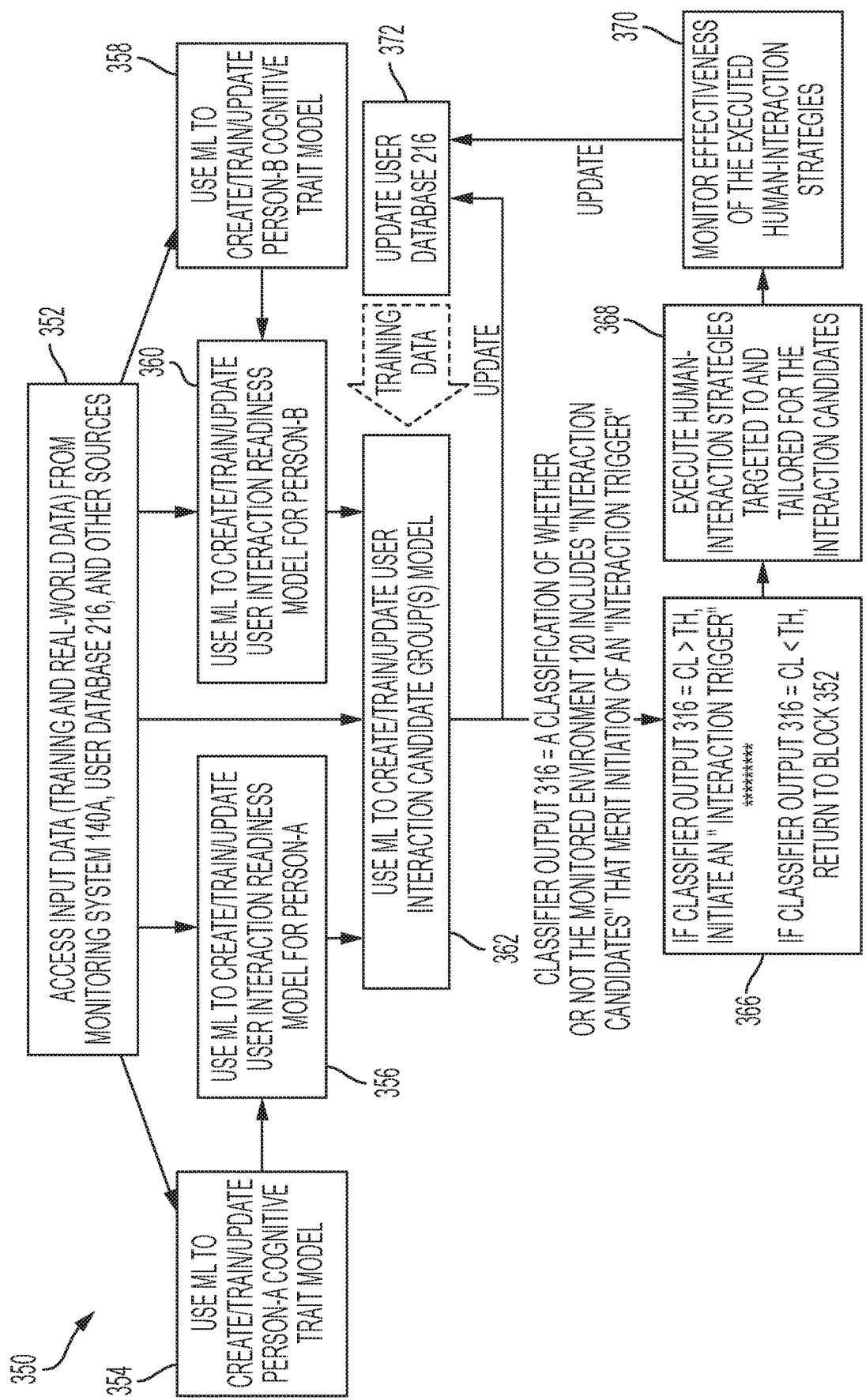
FIG. 2B depicts a flow diagram illustrating a methodology according to embodiments of the invention.

FIG. 2A depicts a block diagram illustrating another example of a system 100A according to embodiments of the invention. The system 100A is similar to the system 100 (shown in FIG. 1) except the system 100A includes additional details about how the triggering system 110 (shown in FIG. 1) and the monitoring system 140 (shown in FIG. 1) can be implemented in accordance with embodiments of the invention. The system 100A shown in FIG. 2A and the associated methodology 350 shown in FIG. 2B depict aspects of the invention with a focus on the machine learning techniques utilized in the embodiments of the invention described herein. The system 100B shown in FIG. 3 and the associated methodology 400 shown in FIG. 4A depict aspects of the invention with a focus on the broader computer-implemented cognitive analysis techniques utilized in the embodiments of the invention described herein.

Referring still to FIG. 2A, as with the system 100 (shown in FIG. 1), the cloud computing system 50 is in wired or wireless electronic communication with one or all of the components/modules of the system 100A. Cloud computing system 50 can supplement, support, or replace some or all of the functionality of the components/modules of the system 100A. Additionally, some or all of the functionality of the components/modules of the system 100A can be implemented as a node 10 (shown in FIG. 10) of the cloud computing system 50. The various components/modules of the system 100A are depicted separately for ease of illustration and explanation. In embodiments of the invention, the functions performed by the various components/modules of the system 100A can be distributed differently than shown. For example, some or all of the functionality of the system 100A (e.g., the classifier 310) could be integrated in any of the devices of the monitoring system 140 that have sufficient processor and storage capability (e.g., mobile computing device 126, computing device 128) to execute the functionality.

Many of the functional units of the systems 100A and 100B (shown in FIG. 3) described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

As shown in FIG. 2A, the system 100A includes a computer-based cognitive human interaction triggering system 110A in wired or wireless communication with a physical or virtual monitoring system 140A. The monitoring system 140A is configured and arranged to monitor an environment such as the environment 120 shown in FIG. 1. The monitoring system 140A is further configured and arranged to monitor the environment 120 in a manner that also monitors various aspects (e.g., emotional state, cognitive traits, availability, biometrics, etc.) about the persons/users (e.g., Person/User A, Person/User B shown in FIG. 1) in the environment 120. In embodiments of the invention, the physical or virtual monitoring system 140A includes a video/audio capture module 240, a video/audio presentation module 242, other rendering device modules 244, and other sensors modules 246, all of which are communicatively coupled to one another. In embodiments of the invention, the video/audio capture module 240 includes any suitable component or set of components configured to capture and store video, still images and audio generated in the monitored environment 120. Examples of suitable video/audio capture components include, but are not limited to, video cameras, microphones, computers, smart phones, text message enabled devices, and the like. In embodiments of the invention, the video/audio presentation module 242 includes any suitable component or set of components configured to present video, still images and audio to users/persons (e.g., Person/User A, Person/User B shown in FIG. 1) in the monitored environment 120. Examples of suitable video/audio presentation components include, but are not limited to, smart phones, speakers, computers, video monitors, and the like. Some capture devices in the video/audio capture module 240 can also function as presentation devices, and some presentation device in the video/audio presentation module 242 can also function as capture devices. In embodiments of the invention, the other rendering devices module 244 includes any suitable component or set of components configured to generate and present rendered communications to users/persons (e.g., Person/User A, Person/User B shown in FIG. 1) in the monitored environment 120. Examples of suitable other rendering devices include, but are not limited to, a computer graphics computer program configured to generate a photorealistic or non-photorealistic image (i.e., a rendering) from a two-dimensional (2D) or three-dimensional (3D) model. Rendering techniques are used in a variety of applications such as architecture, video games, simulators, movie/TV visual effects, and design visualization.

In embodiments of the invention, the other sensors module 246 includes any suitable component or set of components configured to capture and store sensed data (other than video, still images, and audio) generated in the monitored environment 120. Examples of suitable video/audio capture components include, but are not limited to, photodetectors, indoor positioning systems, object identification systems, wearable biometric sensors, and the like. The indoor positioning system can include various positioning-enabled sensors such as GPS receivers, accelerometers, gyroscopes, digital compasses, cameras, Wi-Fi etc. that are often built into the mobile computing device 126 (shown in FIG. 1). The indoor positioning system can also be described as a hybrid positioning system that relies on several different positioning technologies, including, for example, GPS, cell tower signals, wireless internet signals, Bluetooth sensors, IP addresses, and network environment data. These systems are specifically designed to overcome the limitations of GPS, which is very exact in open areas, but works poorly indoors or between tall buildings (the urban canyon effect). By comparison, cell tower signals are not hindered by buildings or bad weather, but usually provide less precise positioning. Wi-Fi positioning systems can give very exact positioning, in urban areas with high Wi-Fi density but depend on a comprehensive database of Wi-Fi access points.

The object identification system can be implemented using a variety of technologies including image-based and/or acoustic-based object identification technologies. Image-based object identification can rely on a camera system (e.g., camera 122 shown in FIG. 1) of the monitoring system 140A, along with image processing algorithms to identify the objects (including persons/users) in the image. Acoustic-based object identification can be implemented as, for example, an acoustic pulse-echo system that include a source of ultrasonic energy, an ultrasonic transducer coupled to the source for emitting a narrow pulse or series of pulses of ultrasonic energy, a second ultrasonic transducer for receiving return pulses from objects within a predetermined detection zone, and a detection circuit coupled to the ultrasonic transducer for providing output signals when a predetermined criterion is met by the return pulses. The output signals can be analyzed by known algorithms to generally identify classes of objects (including persons/users).

In accordance with aspects of the invention, the video/audio capture module 240, the video/audio presentation module 242, the other rendering device modules 244, and the other sensors modules 246 of the physical or virtual monitoring system 140A are configured and arranged to interact with and monitor the activities of persons/users (e.g., Person/User A, Person/User B) within the monitored environment 120 (shown in FIG. 1) to generate and transmit data (e.g., monitoring data, training data, learning data, etc.) about the environment 120 and persons/users in the environment 120 to the cognitive human interaction triggering system 110A.

The triggering system 110A includes a classifier(s) 310 communicatively coupled to a user database 216. In embodiments of the invention, the user database 216 can be implemented as a relational database that is located in memory (e.g., memory 1128 shown in FIG. 11) or any other storage location of the system 100A. In general, a database is a means of storing information in such a way that information can be retrieved from it. A relational database presents information in tables with rows and columns. A table is referred to as a relation in the sense that it is a collection of objects of the same type (rows). Data in a table can be related according to common keys or concepts, and the ability to retrieve related data from a table is the basis for the term relational database. A database management system (DBMS) handles the way data is stored, maintained, and retrieved. In the case of a relational database, a relational database management system (RDBMS) performs these tasks.

The classifier 310 includes natural language processing (NLP) algorithms 311 that include and/or work with machine learning (ML) algorithms 312. In general, the NLP algorithms 311 include speech recognition functionality that allows the system 110A to receive natural language data (text and audio) and apply elements of language processing, information retrieval, and machine learning to derive meaning from the natural language inputs and potentially take action based on the derived meaning. The NLP algorithms 311 used in accordance with aspects of the invention also include speech synthesis functionality that allows the system 110A to translate the system's actions into natural language (text and audio) to communicate aspects of the system's actions as natural language communications.

The NLP and ML algorithms 311, 312 receive and evaluate input data (i.e., training data and application data) from a variety of sources, including, for example, the monitoring system 140A and the user database 216. In embodiments of the invention, the input data can take a variety of forms, and non-limiting examples of input data are described below. The input data can include person identification and recognition data obtained from detecting the presence of a user in the environment 120 (FIG. 1). The input data can further include sensor data regarding the emotional and stress level of each user in the environment 120. Such sensor data can be obtained via wearable computing and sensing devices. The input data can further include directional eye gaze information detected for each user in the environment 120 using, for example, the camera 122 (shown in FIG. 1) and appropriate face recognition algorithms. In conjunction with personal sensor data (e.g., emotional level), this information could be used to detect a user's intent to initiate a conversation. For example, detecting that a user is looking in the direction of or observing another user during a certain time might be an indication that the user would likely be open to socializing (i.e., having a human-interaction) with the other person or a group. The input data can further include distance data between/among users in the environment 120.

The input data can further include historical data about the schedule of a particular user in the environment 120 (shown in FIG. 1), time the user spends in a particular part of the environment 120 (based on identification and recognition), data about the duration of conversations with and without interventions, the effectiveness of bringing different topics (e.g., telling a joke or asking someone's opinion about a topic or to join an ongoing conversation), user profiles, and the like. The input data can further include the number of conversations in which a given user has been involved in the environment 120 throughout a given day. The number of conversations a particular user has had in a day (until the given moment), durations of each of the conversations etc., can be used by the triggering system 110A to determine how productive the user is likely to be if the user engages in additional conversations that day. The input data can further include a predefined set of topics of interest to the entity that controls the environment 120. For example, an employer can specify the predefined set of topics and use the triggering system 100, 100A, 100B to incentivize employees to talk about predefined topic.

The ML algorithms 312 can include functionality that is necessary to interpret and utilize the input data. For example, the ML algorithms 312 can include visual recognition software configured to interpret image data captured by the video/audio capture module 240. The ML algorithms 312 apply machine learning techniques to received training data in order to, over time, create/train/update various models, including, for example, models of person/users (e.g., Person/User A, Person/User B shown in FIG. 1) within the monitored environment 120 (shown in FIG. 1). In accordance with aspects of the invention, the models created/trained/updated by the ML algorithms 312 can include, but are not limited to, a user cognitive traits model, a user interaction readiness model, and a group interaction readiness model. The ML algorithms 312 generate the above-described models by extracting features from the training data in order to "classify" the training data against the target model and uncover relationships between and among the classified training data. Examples of suitable implementations of the classifier 310 and ML algorithms 312 include but are not limited to neural networks, support vector machines (SVMs), logistic regression, decision trees, hidden Markov Models (HMMs), etc. The learning or training performed by the classifier 310 and ML algorithms 312 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 310 and the ML algorithms 312. Unsupervised learning can utilize additional learning/training methods including, for example, clustering, anomaly detection, neural networks, deep learning, and the like. In some embodiments of the invention, training data from a variety of instances of the system 100A can be accumulated and stored (e.g., at the clouding computing system 50 shown in FIGS. 1 and 9) and provided through a wired or a wireless connection as additional training data for creating the above-described models.

When the above-described models are sufficiently trained by the NLP and ML algorithms 311, 312, the NLP and ML algorithms 311, 312 apply "real world" data to the models in order to output from the classifier 310 a classifier output 316. In embodiments of the invention, the classifier output 316 is a classification of whether or not the real-world data indicates that the monitored environment 120 (shown in FIG. 1) includes "interaction candidates" that merit the generation of an "interaction trigger." In accordance with aspects of the invention, the classification outputs 316 can be fed back to the classifier 310 and used by the ML algorithms 312 as additional training data for creating the above-described models.

In aspects of the invention, the NLP and/or ML algorithms 311, 312 are configured to apply confidence levels (CLs) to various ones of their results/determinations (including classification outputs) in order to improve the overall accuracy of the particular result/determination. When the NLP and/or ML algorithms 311, 312 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 310 can be configured to apply confidence levels (CLs) to the classifier outputs 316. When the classifier 310 determines that a CL in the classifier output 316 is below a predetermined threshold (TH) (i.e., CL<TH), the classifier output 316 can be classified as sufficiently low to justify a classification of "no confidence" in the classifier output 316, in which case, the triggering system 110A would conclude that the monitored environment 120 (shown in FIG. 1) does not include "interaction candidates" that merit initiation of an "interaction trigger." If CL>TH, the classifier output 316 can be classified as sufficiently high to justify a determination that the monitored environment 120 includes "interaction candidates" that merit initiation of an "interaction trigger." Many different predetermined TH levels can be provided such that the classifier outputs 316 with CL>TH can be ranked from the highest CL>TH to the lowest CL>TH.

FIG. 2B is a flow diagram illustrating a methodology 350 embodying aspects of the invention. Although the operations of methodology 350 are illustrated in a particular order, it will be understood by persons of ordinary skill in the relevant art that the order of the illustrated operations can be changed without departing from the teachings of this detailed description. In addition, it will be understood by persons of ordinary skill in the relevant art that one or more of the illustrated operations can be omitted, and/or operations not shown can be incorporated, without departing from the teachings in this detailed description.

The methodology 350 can be implemented by the triggering system 110A (shown in FIG. 2A). Accordingly, the following description of the methodology 350 will, where appropriate, reference the portions of the triggering system 100A that are involved in implementing the methodology 350. As shown in FIG. 2B, the methodology 350 begins at block 352 where the triggering system 110A accesses input data from a variety of sources, including, for example, the monitoring system 140A, the user database 216, and other sources. In embodiments of the invention, the input data can include predetermined topic data. The outputs from block 352 are provided to blocks 354, 356, 358, and 460. Blocks 354, 358 apply the ML algorithms 312 to the input data received from block 352 to create/train/update a Person-A Cognitive Traits Model and a Person-B Cognitive Traits Model, respectively. Blocks 354, 358 use the Person-A Cognitive Traits Model and the Person-B Cognitive Trait Model, along with the input data and the ML algorithms 312, to generate classifier outputs that identify the cognitive traits of Person-A and Person-B, respectively. Additional details of how a cognitive traits model can be generated in accordance with aspects of the invention are depicted in FIGS. 5, 6A, 6B, 7, and 8 and described in greater detail later herein.

Blocks 354, 358 provide the cognitive traits of Person-A and Person-B to blocks 356, 360, respectively. Block 356 applies the ML algorithms 312 to the input data received from block 352 and the classifier output (i.e., Person-A cognitive trait) received from block 354 to create/train/update a user interaction readiness model for Person-A. In accordance with aspects of the invention, the ML algorithms 312 generate the user interaction readiness model for person-A by extracting features from the input data received from block 352 and the classifier output (i.e., Person-A's cognitive traits) received from block 354. Any suitable feature extraction technique can be used including, for example, the reduction of the input data received from block 352 and the classifier output (i.e., Person-A's cognitive traits) received from block 354 over some period of time to a set of feature nodes and vectors corresponding to representations of the input data received from block 352 and the classifier output (i.e., Person-A's cognitive traits) received from block 354 in the lower dimensional feature space, are used to identify the emergence of a user's interaction readiness over that period of time. The relationship of one feature node to other similar nodes through edges in a graph corresponds to the temporal order of transitions from one set of measures and the feature nodes and vectors to another. Some connected subgraphs of the feature nodes are herein defined as user interaction readiness. Embodiments of the invention describe the analysis, categorization, and identification of user interaction readiness by means of further feature analysis of subgraphs, including dimensionality reduction of the subgraphs, for example by means of graphical analysis, which extracts topological features and categorizes the resultant subgraph and its associated feature nodes and edges within a subgraph feature space. Block 356 uses the ML algorithms 312 to apply the input data received from block 352 and the classifier output (i.e., Person-A cognitive trait) received from block 354 to the user interaction readiness model for Person-A to generate a classifier output (i.e., Person-A's interaction readiness) from block 356.

Block 360 applies the ML algorithms 312 to the input data and the classifier output from block 358 (i.e., Person-B cognitive trait) to create/train/update a user interaction readiness model for Person-B. In accordance with aspects of the invention, the ML algorithms 312 generate the user interaction readiness model for person-B by extracting features from the input data received from block 352 and the classifier output (i.e., Person-B cognitive trait) received from block 358. Any suitable feature extraction technique can be used including, for example, the reduction of the input data received from block 352 and the classifier output (i.e., Person-B's cognitive traits) received from block 358 over some period of time to a set of feature nodes and vectors corresponding to representations of the input data received from block 352 and the classifier output (i.e., Person-B's cognitive traits) received from block 358 in the lower dimensional feature space, are used to identify the emergence of a user's interaction readiness over that period of time. The relationship of one feature node to other similar nodes through edges in a graph corresponds to the temporal order of transitions from one set of measures and the feature nodes and vectors to another. Some connected subgraphs of the feature nodes are herein defined as user interaction readiness. Embodiments of the invention describe the analysis, categorization, and identification of user interaction readiness by means of further feature analysis of subgraphs, including dimensionality reduction of the subgraphs, for example by means of graphical analysis, which extracts topological features and categorizes the resultant subgraph and its associated feature nodes and edges within a subgraph feature space. Block 360 uses the ML algorithms 312 to apply the input data received from block 352 and the classifier output (i.e., Person-B cognitive trait) received from block 358 to the user interaction readiness model for Person-B to generate a classifier output (i.e., Person-B's interaction readiness) from block 360.

Block 362 applies the ML algorithms 312 to the input data received from block 352, the classifier output (i.e., Person-A's interaction readiness) received from block 356, the classifier output (i.e., Person-B's interaction readiness) received from block 360, and updated user database training data received from block 372 to create/train/update a user interaction candidate group model covering Person-A and Person-B. In embodiments of the invention, the user interaction candidate group model can be defined as a model that identifies from real-world data and other ML classifications (e.g., the outputs from blocks 356, 360) human-interaction candidates (e.g., Person/User A, Person/User B) in the environment 120 (shown in FIG. 1). In embodiments of the invention, the user interaction candidate group model can be configured to define human-interaction candidates based on a variety of human-interaction candidate criteria, including but not limited to user cognitive traits, user emotional state, user availability, user location within the environment 120, topics of interest to the user, and the like.

In accordance with aspects of the invention, the ML algorithms 312 generate the user interaction candidate group model by extracting features from the input data received from block 352, the classifier output (i.e., Person-A's interaction readiness) received from block 356, the classifier output (i.e., Person-B's interaction readiness) received from block 360, and updated user database training data received from block 372 in order to "classify" the feature-extracted data against the human-interaction candidate criteria and uncover relationships between and among the feature-extracted data. Any suitable feature extraction technique can be used including, for example, the reduction of the input data received from block 352, the classifier output (i.e., Person-A's interaction readiness) received from block 356, the classifier output (i.e., Person-B's interaction readiness) received from block 360, and updated user database training data received from block 372 over some period of time to a set of feature nodes and vectors corresponding to representations of the input data received from block 352, the classifier output (i.e., Person-A's interaction readiness) received from block 356, the classifier output (i.e., Person-B's interaction readiness) received from block 360, and updated user database training data received from block 372 in the lower dimensional feature space, are used to identify the emergence of a certain interaction candidate groups over that period of time. The relationship of one feature node to other similar nodes through edges in a graph corresponds to the temporal order of transitions from one set of measures and the feature nodes and vectors to another. Some connected subgraphs of the feature nodes are herein defined as the user interaction candidates group. Embodiments of the invention describe the analysis, categorization, and identification of the user interaction candidate group by means of further feature analysis of subgraphs, including dimensionality reduction of the subgraphs, for example by means of graphical analysis, which extracts topological features and categorizes the resultant subgraph and its associated feature nodes and edges within a subgraph feature space.

Another suitable features extraction technique is a topic modeling techniques such as Latent Dirichlet Allocation (LDA). In NLP, LDA is a generative statistical model that allows sets of observations to be explained by unobserved groups that explain why some parts of the data are similar. For example, if observations are words collected into documents, LDA posits that each document is a mixture of a small number of topics and that the creation of each word is attributable to one of the document's topics.

In aspects of the invention, the correlation between human-interaction candidates can be determined using a similarity metric technique. In general, similarity metric techniques are used to determine the similarity between two things. A similarity score can be developed by quantifying different attributes of data objects, and employing different similarity algorithms across those attributes to yield similarity scores between the different data objects. For example, a group of people can be represented electronically as data objects whose attributes are tastes in movies. A similarity metric can be used to find the people who are similar based measuring how similar are their tastes in movies. Examples of suitable similarity metric techniques include, for example, Euclidean Distance techniques, Pearson Coefficient techniques, Jaccard Coefficient techniques, and the like.

When block 362 has sufficiently created and trained the user interaction candidate group model, block 362 uses the ML algorithms 312 to apply real-world data received from block 352 to the completed user interaction candidate group model to generate the classifier output 316. In accordance with embodiments of the invention, the classifier output 316 is a classification of whether or not the monitored environment 120 includes "interaction candidates" that merit initiation of an "interaction trigger."

In accordance with aspects of the invention, the classifier 310 can be configured to apply confidence levels (CLs) to all of the above-described classification outputs generated by the methodology 350, and particularly the classification output 316. When the classifier 310 determines that a CL in any of the classification outputs is below a predetermined threshold (TH) (i.e., CL<TH), the classification output can be classified as sufficiently low to justify a classification of "no confidence" in the classification output, and this classification would be passed through to any downstream blocks of the methodology 350 tagged as a "no confidence" classification. If CL>TH, the classification output can be classified as sufficiently high to justify a classification of "sufficient confidence" in the classification output, and this classification would be passed through to any downstream blocks of the methodology 350 tagged as a "sufficient confidence" classification. Focusing on the classifier output 316, when the classifier 310 determines that a CL in the classifier output 316 is below a predetermined threshold (TH) (i.e., CL<TH), the classifier output 316 can be classified as sufficiently low to justify a classification of "no confidence" in the classifier output 316, in which case, the triggering system 110A would conclude that the monitored environment 120 (shown in FIG. 1) does not include "interaction candidates" that merit initiation of an "interaction trigger." If CL>TH, the classifier output 316 can be classified as sufficiently high to justify a determination that the monitored environment 120 includes "interaction candidates" that merit initiation of an "interaction trigger." Many different predetermined TH levels can be provided such that the classifier outputs 316 with CL>TH can be ranked from the highest CL>TH to the lowest CL>TH.

Block 366 receives the classifier output 316. If CL<TH for the classifier output 316, the methodology 350 returns to block 352. If CL>TH for the classifier output 316, the methodology 350 initiates an "interaction trigger," which prompts the methodology 350 at block 368 to execute human-interaction strategies targeted to and tailored for the members (e.g., Person-A, Person-B) of the user interaction readiness group identified at blocks 356, 360. At block 370, the methodology 350 monitors the effectiveness of the executed human-interaction strategies and provides the results of the monitoring that occurs at block 370 to block 372 where the methodology 350 stores the results of the monitoring in the user database 216. At block 372, the methodology 350 provides the results of the monitoring that occurs at block 370 to block 362 as additional training inputs to the ML algorithms 312 used at block 362.

Figure 3:
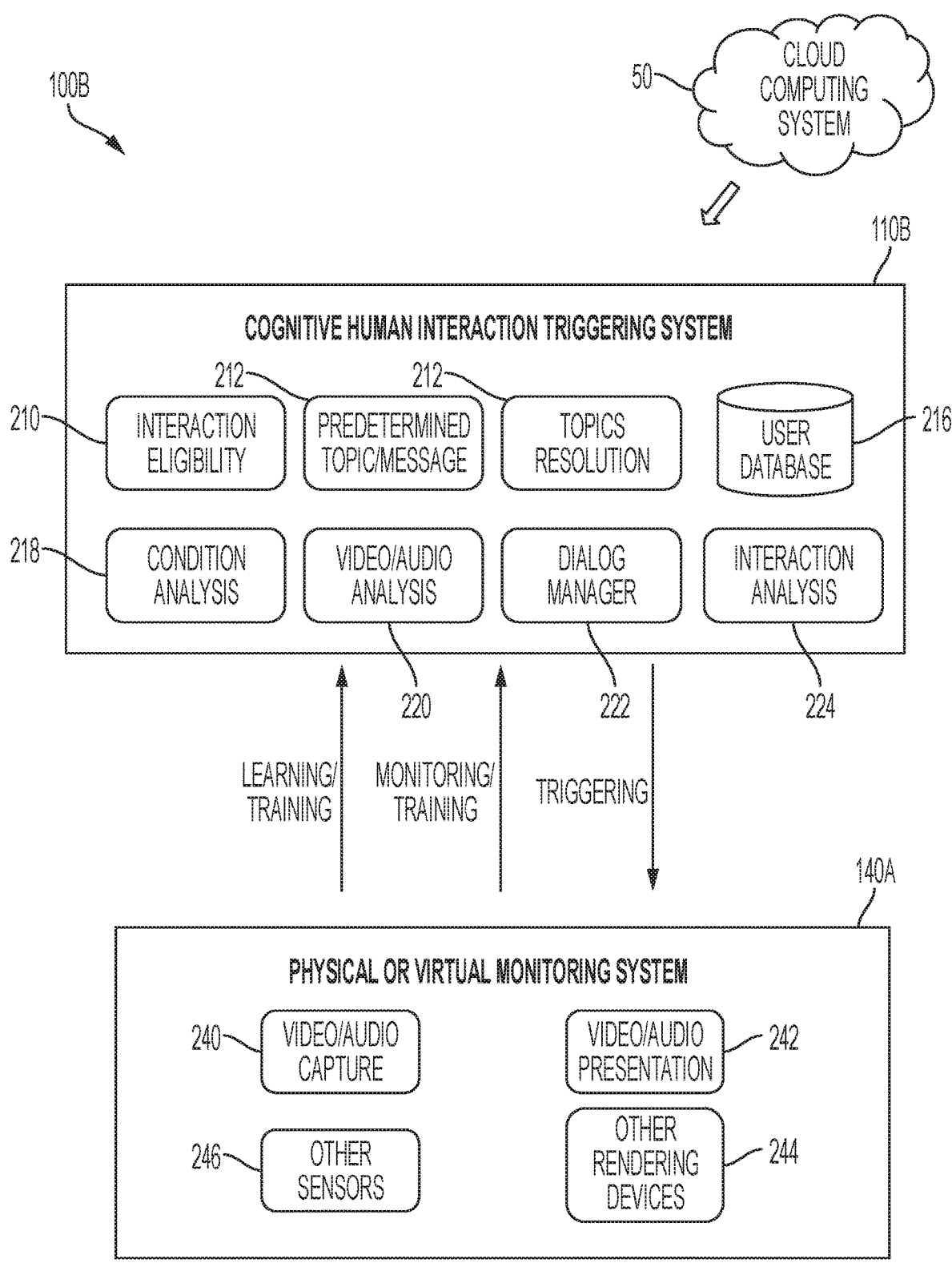
FIG. 3 depicts a block diagram illustrating another more detailed example of a system according to embodiments of the invention.
Figure 4A:
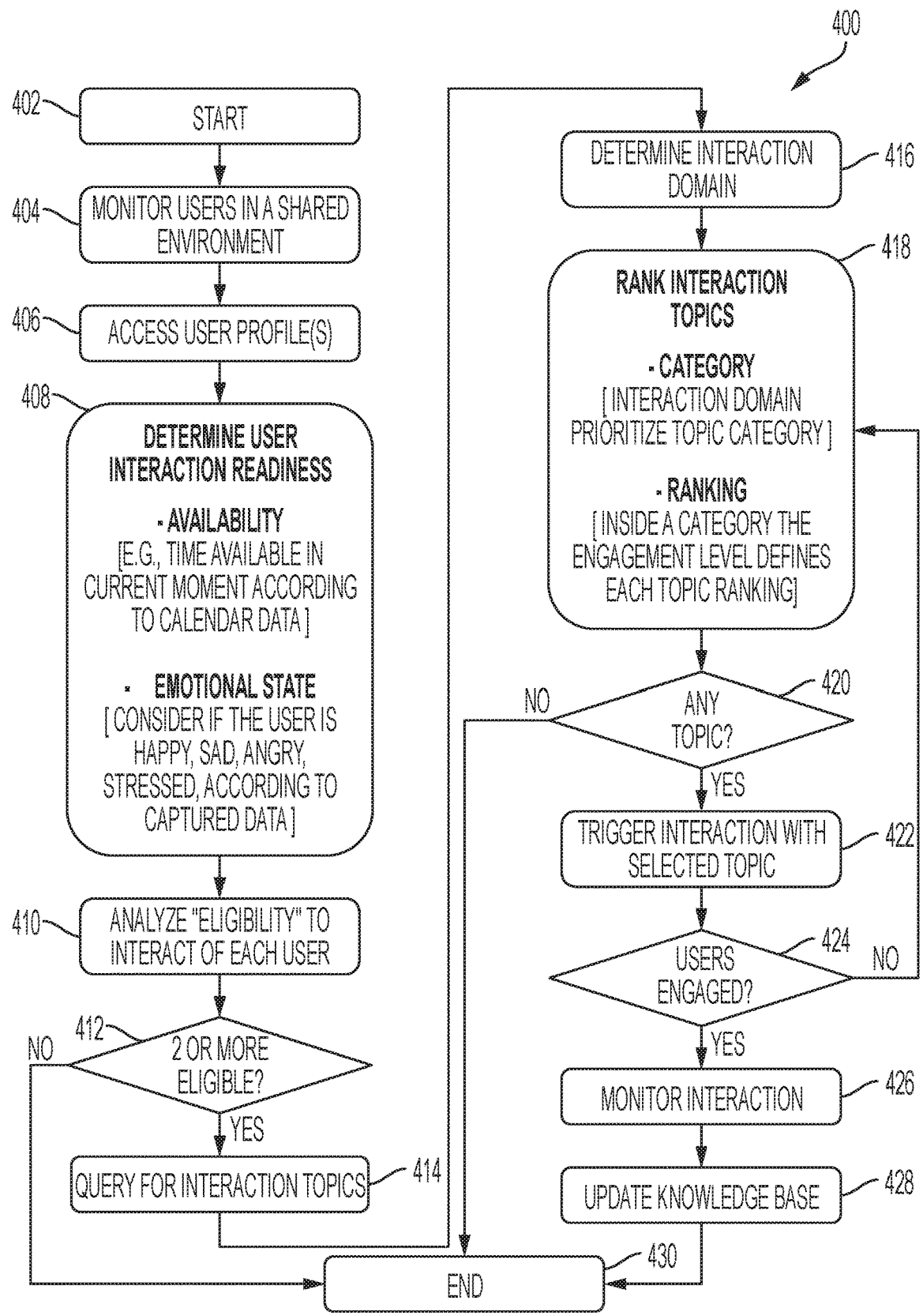
FIG. 4A depicts a flow diagram illustrating a methodology according to embodiments of the invention.

FIG. 3 depicts a block diagram illustrating another example of a system 100B according to embodiments of the invention. The system 100B is similar to the system 100 (shown in FIG. 1) except the system 100B includes additional details about how the triggering system 110 (shown in FIG. 1) and the monitoring system 140 (shown in FIG. 1) can be implemented in accordance with embodiments of the invention. As previously noted herein, the system 100A shown in FIG. 2A and the associated methodology 350 shown in FIG. 2B depicts aspects of the invention with a focus on the machine learning techniques utilized in accordance with embodiments of the invention. The system 100B shown in FIG. 3 and the associated methodology 400 shown in FIG. 4A depict aspects of the invention with a focus on the broader computer-implemented cognitive analysis techniques utilized in accordance with embodiments of the invention. In accordance with embodiments of the invention, the machine learning functionality of the system 100A can be used to implement corresponding operations in the system 100B. More specifically, any of the cognitive determinations/functionality of the modules 210, 212, 214, 216, 218, 220, 222, 224 of the triggering system 110B of the system 100B can be implemented using aspects of the machine learning functionality of the system 100A.

Referring still to FIG. 3, as with the system 100 (shown in FIG. 1), the cloud computing system 50 is in wired or wireless electronic communication with one or all of the components/modules of the system 100B. Cloud computing system 50 can supplement, support, or replace some or all of the functionality of the components/modules of the system 100B. Additionally, some or all of the functionality of the components/modules of the system 100B can be implemented as a node 10 (shown in FIG. 10) of the cloud computing system 50. The various components/modules of the system 100B are depicted separately for ease of illustration and explanation. In embodiments of the invention, the functions performed by the various components/modules of the system 100B can be distributed differently than shown. For example, some or all of the functionality of the system 100A (e.g., the user database 216) could be integrated in any of the devices of the monitoring system 140A that have sufficient processor and storage capability (e.g., mobile computing device 126, computing device 128 shown in FIG. 1) to execute the functionality.

As shown in FIG. 3, the system 100B includes a computer-based cognitive human interaction triggering system 110B in wired or wireless communication with the physical or virtual monitoring system 140A. The monitoring system 140A is configured and arranged to monitor an environment such as the environment 120 shown in FIG. 1. As the details of the monitoring system 140A shown in FIG. 3 have been described herein in connection with the same monitoring system 140A that is part of the system 100B shown in FIG. 2A, the same descriptions are not repeated here.

The triggering system 110B includes an interaction eligibility module 210, a predetermined topic/message module 212, a topics resolution module 214, a user database 216, a condition analysis module 218, a video/audio analysis module 220, a dialog manager module 222, and an interaction analysis module 224, all of which are communicatively coupled to one another. In embodiments of the invention, the triggering system 110B receives and analyzes "input data," which can be substantially the same as the various types of "input data" utilized by the NLP and ML algorithms 311, 312 of the triggering system 110A (shown in FIG. 2A). In embodiments of the invention, the interaction eligibility module 210 evaluates "input data" to determine the users (e.g., Person/User A, Person/User B shown in FIG. 1) that are likely (e.g., CL>TH) to interact in the shared environment 120 (shown in FIG. 1). In some aspects of the invention, the analysis performed at module 210 can be based at least in part on an interaction readiness index and an eligibility threshold. The predetermined topic/message module 212 captures external demands to influence the human-interaction to include interests of another party. For example an employer can specify important skills to be acquired by a particular employee or a corporate message that needs to be disseminated among certain employees. The user database 216 contains among others items personal data, interests, preferences and skill levels of persons/user (e.g., Person/User A, Person/User B) in the shared environment 120. The user database 216 also keeps a knowledge base of previous interactions for each person/user (e.g., Person/User A, Person/User B). The user database 216 also maintains information about the level of engagement of each user towards different topics and other users.

The condition analysis module 218 determines the readiness of each user (e.g., Person/User A, Person/User B shown in FIG. 1) for a human-interaction. The analysis performed by the module 218 can considers different factors, including but not limited to, user availability (e.g., as reflected in a user's electronic calendar), user emotional level, user cognitive traits, user social interaction level (e.g., by monitoring the frequency of conversations carried out by the users), and others. The video/audio analysis module 220 receives and processes the audio/video feeds (e.g., from the audio/video capture module 240) of the monitored environment 120 (shown in FIG. 1). The module 220 identifies the users, captures their body behavior, and the tone in how they are communicating, among other information. The dialog manager module 222 is responsible for triggering or not triggering the human-interaction. If it is determined by the triggering system 140B that the human-interaction operations should be triggered, the topic with highest priority is retrieved and the most suitable channel of delivery for the trigger is chosen. The trigger can be for example an audio message or a video clip delivered through the video/audio presentation module 242 of the monitoring system 140A. The interaction analysis module 224 keeps track of the human-interaction once it is triggered for learning purposes (e.g., by the ML algorithms 312 of the system 100B shown in FIG. 2A). The module 224 verifies if the users are engaged or not. In case the interaction is successful, the module 224 analyzes the level of engagement and interest of each participant. The module 224 loads collected data into the knowledge base (e.g., user database 216).

FIG. 4A is a flow diagram illustrating a methodology 400 embodying aspects of the invention. Although the operations of methodology 400 are illustrated in a particular order, it will be understood by persons of ordinary skill in the relevant art that the order of the illustrated operations can be changed without departing from the teachings in this detailed description. In addition, it will be understood by persons of ordinary skill in the relevant art that one or more of the illustrated operations can be omitted, and/or operations not shown can be incorporated, without departing from the teachings in this detailed description.

The methodology 400 can, in some embodiments of the invention, be implemented by the triggering systems 100, 110A, 100B (shown in FIGS. 1, 2A, and 3). Accordingly, the following description of the methodology 400 will, where appropriate, reference the portions of the triggering systems 100, 100A or 100B that are involved in implementing the relevant portion(s) of the methodology 400. As shown in FIG. 4A, the methodology 400 starts at block 402 then moves to block 404 where the monitoring system 140A captures sensed data from the video/audio capture module 240 and the other sensors module 246. The sensed data is used to identify and gather wide variety of data related to users (e.g., Person/User A, Person/User B shown in FIG. 1) in the shared/monitored environment 120 (shown in FIG. 1). In block 406, the triggering system 110, 110A, 110B accesses user profiles, which can be stored in the user database 216. The user profiles can be built in a variety of ways including direct entry by users, as well as information gathered by monitoring activities of the monitoring system 140, 140A. The user profile can include personal data, preferences data, personality data, user knowledge on relevant subjects, images of the user for facial recognition analysis, and other user information.

Figure 4B:
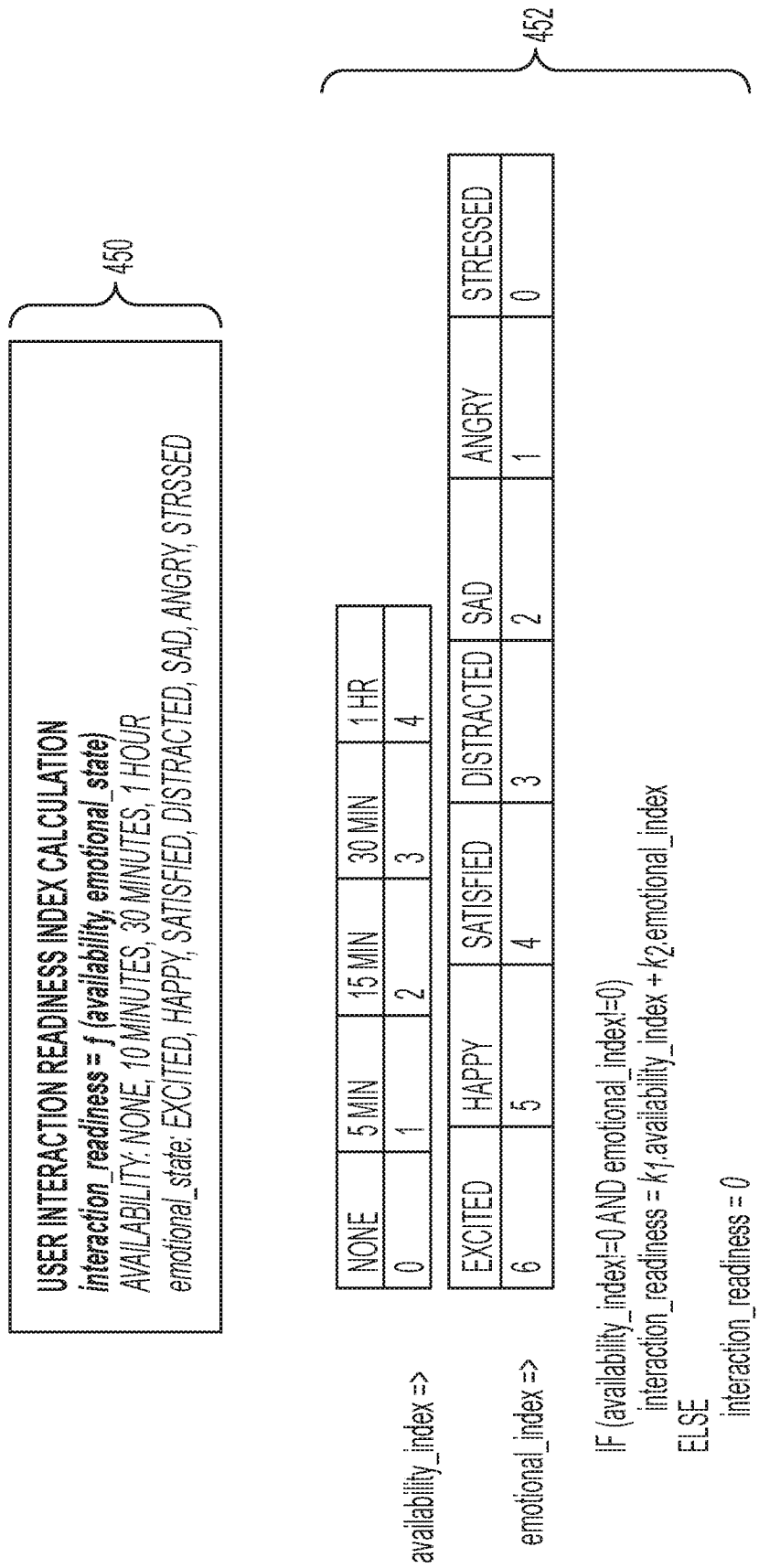
FIG. 4B depicts diagrams illustrating a method of determining a user's interaction readiness in accordance with the methodology shown in FIG. 4A.

In block 408, the methodology 400 uses the triggering system 110, 110A, 110B to evaluate (e.g., using rule based analysis) the user profile data and other input data to infer therefrom each user's "interaction readiness." In embodiments of the invention, the user's "interaction readiness" can be determined by applying rule based analysis to input data to determine therefrom a user's availability and emotional state at the moment of a potential interaction to determine the user's readiness to interact with other users in the environment 120 (shown in FIG. 1). An example of a rule-based analysis for evaluating "input data" to infer therefrom a user's interaction readiness is face recognition software configured utilize data from known facial expressions to recognize and classify user facial expressions that represent basic emotions such as anger or happiness. FIG. 4B depicts at diagrams 450, 452 example methods for capturing and evaluating a user's interaction readiness by performing user interaction readiness index calculations and recording an availability index and an emotional index as an indicator of the user's readiness to interact.

In block 410, for each user determined at block 408 to have "interaction readiness," the methodology 400 at block 410 determines the user's interaction eligibility. In embodiments of the invention, the user's interaction eligibility can be determined by applying rule-based analysis to "input data" to infer therefrom a user's interaction eligibility. In embodiments of the invention, the user's interaction eligibility can be captured by computing continuously an "eligibility for socialization" level or score at that moment based on the results of the rule based analysis of the aforementioned "input data." The output of this function could be between "0" (not eligible) and "1" (completely eligible to socialize). An example of a rule-based analysis for evaluating "input data" to infer therefrom a user's interaction eligibility is data from an indoor positioning system (e.g., other sensors module 246 shown in FIGS. 2A and 3) indicating that two users are sitting at the same table in a cafeteria during lunch. FIG. 4C depicts at diagram 454 an example method for capturing and evaluating a user's interaction eligibility by performing user interaction eligibility calculations.

At decision block 412, an inquiry is made to determine whether or not two or more users are eligible for interaction. If the result of the inquiry at decision block 412 is no, the methodology 400 proceeds to block 430 and ends. In embodiment of the invention, block 430 can be configured to return the methodology 400 to block 402 after predetermined wait time. If the result of the inquiry at the decision block 412 is yes, the methodology 400 proceeds to block 414 and searches for interaction topics that are common to all interaction eligible users. Topics can be divided into categories, including but not limited to personal interests, professional interests, predetermined topics/messages, real-time detected, social networks captured, and the like. In embodiments of the invention, topics can be identified at block 414 using the topic modeling techniques applied at block 362 of the methodology 350 shown in FIG. 2B. In embodiments of the invention, topics can be identified at block 414 using a matchmaking algorithm to look into users' profiles, social and professional online networks and select a possible topic. In embodiments of the invention, predetermined topics/messages can be automatically selected or can take priority over other topic categories.

At block 416, the methodology 400 determines the nature of the domain (or environment 120 shown in FIG. 1) where the interaction between interaction eligible users is about to take place. In embodiments of the invention, examples of the nature of the domain include but are not limited to work, a technical conference, a social gathering, a social network environment, a web conference, and the like. The nature of the domain is useful in the methodology 400 because the same users can react one way to a topic that comes up in one domain and react differently to the same topic if it comes up in a different domain.

At block 418, the topics are ranked using a rule-based analysis, wherein the rules are determined based on a predetermined set of priorities (e.g., likely engagement level as reflected by user profile and other input data) and the interaction domain.

At decision block 420, an inquiry is made to determine whether at least one interaction topic has been identified. If the result of the inquiry at decision block 420 is no, the methodology 400 proceeds to block 430 and ends. In embodiment of the invention, block 430 can be configured to return the methodology 400 to block 402 after predetermined wait time. If the result of the inquiry at the decision block 420 is yes, the methodology 400 proceeds to block 422. At block 422, an interaction based on the selected topic is triggered by the triggering system 100, 100A, 100B (shown in FIGS. 1, 2A, 3) delivering into the shared environment 120 (shown in FIG. 1) a human interaction strategy. In embodiments of the invention, once a topic is defined and selected, natural language dialog manager technology (e.g., NL algorithm 311 shown in FIG. 2A) can be to initiate conversation (i.e., human interaction) between at least the users identified as being eligible for human interaction. As the conversation progresses, the methodology 400 can identify additional interaction eligible users for the topic, and invite such additional interaction eligible users to join the conversation. In embodiments of the invention the human interaction strategy utilize a variety of communication media, including but not limited to video, images, audio or text that relate to the topic.

At decision block 424, an inquiry is made to determine whether or not users are sufficiently engaged with the selected topic. If the result of the inquiry at decision block 424 is no, the methodology 400 proceeds to block 418 (or block 414) and attempts to select another topic. If the result of the inquiry at the decision block 424 is yes, the methodology 400 proceeds to block 430 and ends. In embodiment of the invention, block 430 can be configured to return the methodology 400 to block 402 after predetermined wait time.

An example of a use-case will now be provided in accordance with aspects of the invention. The system 100, 100A, 100B determines that person-A is in the workplace kitchen preparing coffee. Through monitoring and cognitive analysis, the system 100, 100A, 100B is aware that person-A does this every day about the same time and spends around 5 minutes in the process. The system 100, 100A, 100B is aware, through monitoring and cognitive analysis, that on this particular day person-A has only been involved in a few conversations with colleagues. Accordingly, the system 100, 100A, 100*b* determines cognitively that this level of interaction has not placed person-A in a position where additional conversations and human interactions will compromise person-A's well being. While person-A is in the kitchen, person-B enter the kitchen to prepare tea and approaches the same area of the kitchen where person-A is preparing coffee. In this context, based on the analysis of all the aforementioned data, the system 100, 100A, 100B would, using the methodologies 350 and/or 400, determine that person-A and person-B are human interaction candidates because they are both available, in the same space, and have a topic that is of interest to both person-A and person-B. The system 100, 100A, 100B could change the subject of an ongoing dialog or even start it by introducing the topic that the system 100, 100A, 100B has determined is of interest and/or relevant to both person-A and person-B. The system 100, 100A, 100B could, using the methodologies 350, 400, identify other interaction candidates in the same area and attempt to bring the other interaction candidates into the conversation (e.g., by asking one of the other interaction candidates what he/she thinks about the topic or a comment that was just made about the topic). The system 100, 100A, 100B, using the methodologies 350, 400, would monitor the effectiveness of the above-described interventions by analyzing the conversation (e.g., topic extraction, duration etc.) and providing the results of the effectiveness monitoring to the system 100, 100A, 100B as additional training data for machine learning algorithms that implement the methodologies 350, 400.

Figure 5:
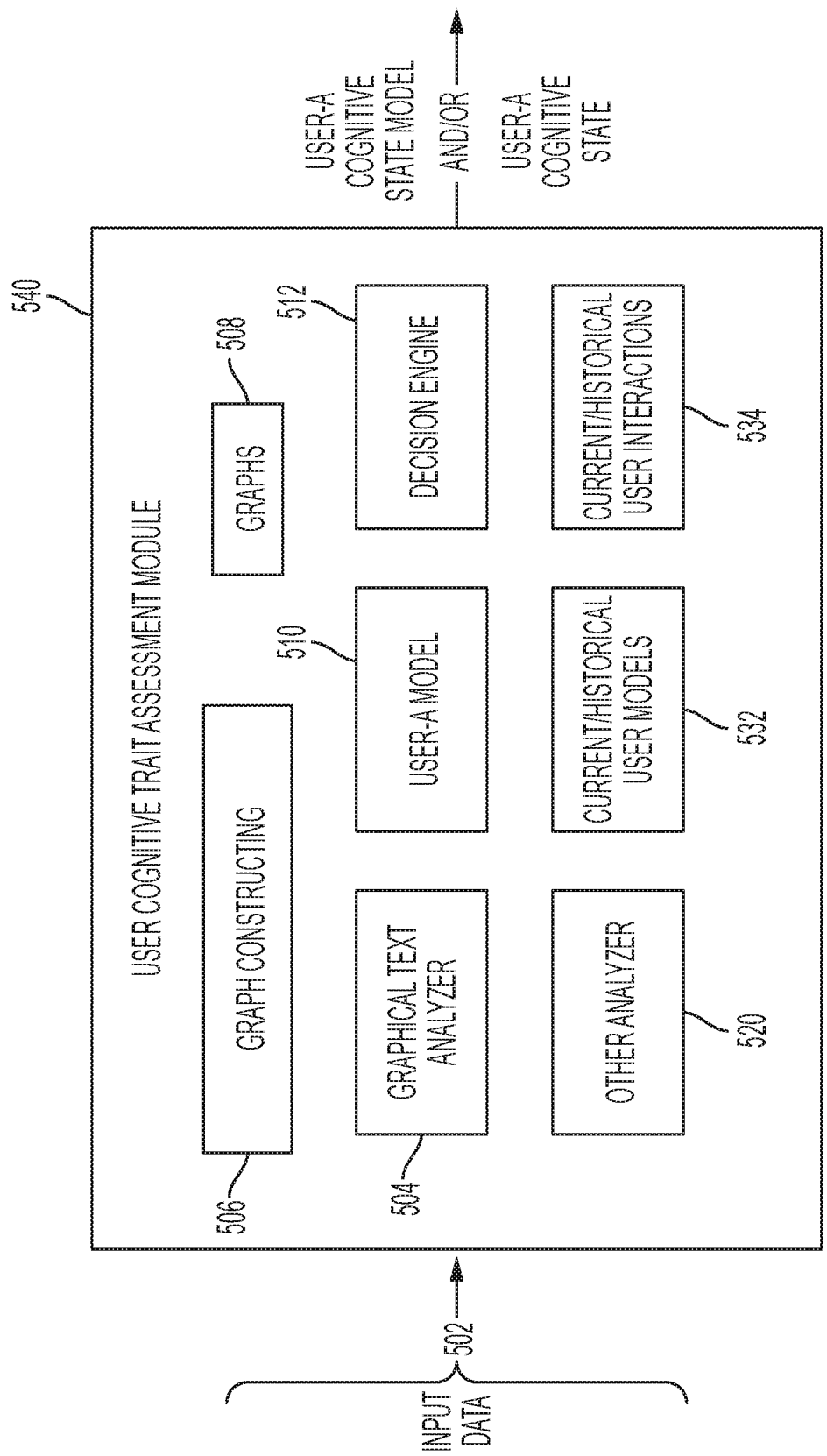
FIG. 5 depicts a diagram illustrating additional details of how to implement a portion of the systems shown in FIGS. 1, 2A, and 3 in accordance with aspects of the invention.

FIG. 5 depicts a diagram illustrating additional details of how to implement any portion of the systems 100, 100A, 100B (shown in FIGS. 1, 2A, and 3) that is configured to apply machine learning techniques to input data 502 (including user-A corpus data) to output a user-A cognitive state model and/or data identifying user-A's cognitive state in accordance with aspects of the invention. More specifically, FIG. 5 depicts a user cognitive trait assessment module 540, which can be incorporated as part of the ML algorithms 312 (shown in FIG. 2A) of the system 100A. The user cognitive trait assessment module 540 includes a graphical text analyzer 504, a graph constructing circuit 506, a graphs repository 508, a user-A model 510, a decision engine 512, an "other" analyzer 520, a current/historical user models module 532, and a current/historical user interactions module 534, all of which are communicatively coupled to one another. In embodiments of the invention, the input data 502 received and analyzed by the user cognitive trait assessment module 540 can be substantially the same as the various types of "input data" utilized by the NLP and ML algorithms 311, 312 of the triggering system 110A (shown in FIG. 2A). In embodiments of the invention, the input data 502 specifically include user-A corpus data. The example module 540 focuses on user-A for ease of illustration and explanation. However, it is understood that the module 540 analyzes input data 502 and generate s cognitive state outputs for all users in the environment 120 (shown in FIG. 1).

User-A corpus of the input data 502 is an assembly of content prepared by or sourced from user-A, such as emails (if permitted), prior meeting audio/notes, speeches, articles, interviews, etc. The input data 502 can also include audio communications of user-A that have been converted to textual communications using one or more suitable speech-to-text techniques.

Graphical text analyzer 504 receives the input data 502, and graph constructing circuit 506 receives data of user-A from graphical text analyzer circuit 504. Graph constructing circuit 506 builds a graph from the received data. More specifically, in some embodiments of the invention wherein the received data is text data, the graph constructing circuit 506 extracts syntactic features from the received text and converts the extracted features into vectors, examples of which are shown in FIGS. 6A and 6B and described in greater detail below. These syntactic vectors can have binary components for the syntactic categories such as verb, noun, pronoun, adjective, lexical root, etc. For instance, a vector [0, 1, 0, 0 . . . ] represents a noun-word in some embodiments of the invention.

Details of an embodiment of the graphical text analyzer 504 will now be provided with reference to FIGS. 6A, 6B, 7 and 8. Referring now to FIG. 6A, there is depicted a graphical text analyzer's output feature vector in the form of a word graph 600 having an ordered set of words or phrases shown as nodes 602, 604, 606, each represented by its own features vector 610, 612, 614 according to one or more embodiments of the invention. Each features vector 610, 612, 614 is representative of some additional feature of its corresponding node 602, 604, 606 in some word/feature space. Word graph 600 is useful to extract topological features for certain vectors, for example, all vectors that point in the upper quadrant of the feature space of words. The dimensions of the word/feature space might be parts of speech (verbs, nouns, adjectives), or the dimensions can be locations in a lexicon or an online resource of the semantic categorization of words in a feature space such as WordNet, which is the trade name of a large lexical database of English. In WordNet, nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated with a browser. WordNet is also freely and publicly available for download from the WorldNet website, www.worldnet.princeton.edu. The structure of WordNet makes it a useful tool for computational linguistics and natural language processing.

FIG. 6B illustrates a graph 620 for a group of persons (e.g., two persons depicted as spotted nodes and white nodes). Specifically, for example, the nodes for one person are spotted, and the nodes for another person are depicted in white. The graph 620 can be built for all persons in the group or constructed by combining graphs for individual persons. In some embodiments of the invention, the nodes of the graph 620 can be associated with identities of the persons.

Figure 8:
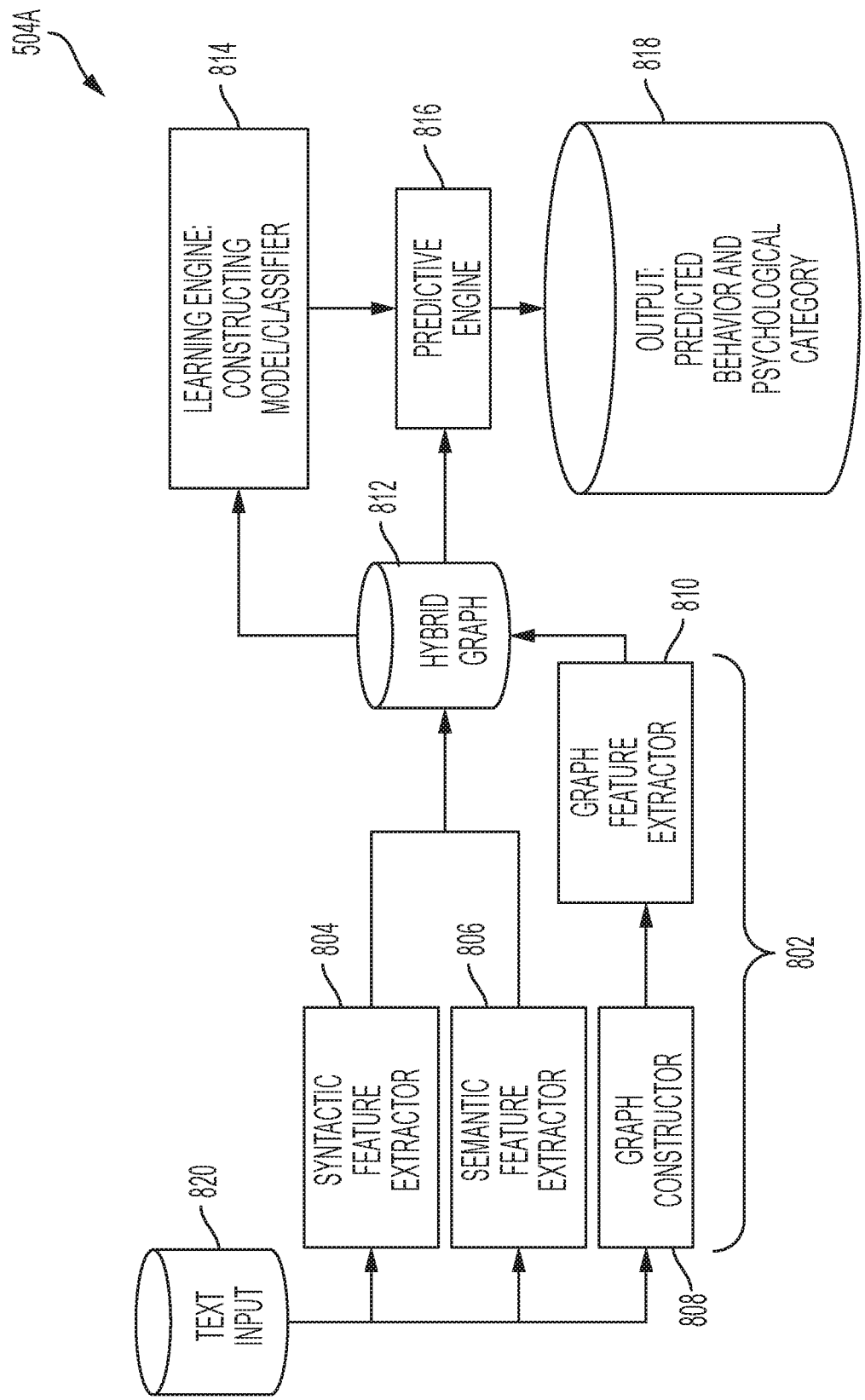
FIG. 8 depicts of a diagram of a graphical text analysis system according to embodiments of the invention.

FIG. 7 depicts Vector A and Equations B-H, which illustrate features of a core algorithm that can be implemented by graphical text analyzer 504A (shown in FIG. 8) having a graphical text analysis module 802 (shown in FIG. 8) according to one or more embodiments of the invention. Graphical text analyzer 504A shown in FIG. 8 is an implementation of graphical text analyzer 504 (shown in FIG. 5), wherein text input 820 receives text of user-A and/or user-A corpus. The text received at text input 820 can be text that has been converted from some other form (e.g., speech) to text. The functionality that converts other, non-text data of user-A to text can be provided in the graphical text analyzer 504 or as a stand-alone circuit.

Continuing with a description of Vector A and Equations B-H of FIG. 7 including selected references to corresponding elements of graphical text analyzer 504A and graphical text analysis module 802 shown in FIG. 8, text or speech-to-text is fed into a standard lexical parser (e.g., syntactic feature extractor 804 of FIG. 8) that extracts syntactic features, which are converted to vectors. Such vectors can have binary components for the syntactic categories verb, noun, pronoun, etcetera, such that the vector represented by Vector A represents a noun word.

The text is also fed into a semantic analyzer (e.g., semantic feature extractor 806 of FIG. 8) that converts words into semantic vectors. The conversion into semantic vectors can be implemented in a number of ways, including, for example, the use of latent semantic analysis. The semantic content of each word is represented by a vector whose components are determined by the singular value decomposition of word co-occurrence frequencies over a large database of documents. As a result, the semantic similarity between two words "a" and "b" can be estimated by the scalar product of their respective semantic vectors represented by Equation B.

A hybrid graph is created in accordance with Equation C in which the nodes "N" represent words or phrases, the edges "E" represent temporal precedence in the speech, and each node possesses a feature vector "W" defined as a direct sum of the syntactic and semantic vectors plus additional non-textual features (e.g. the identity of the speaker) as given by Equation D.

The graph "G" of Equation C is then analyzed based on a variety of features, including standard graph-theoretical topological measures of the graph skeleton as shown by Equation E, such as degree distribution, density of small-size motifs, clustering, centrality, etc. Similarly, additional values can be extracted by including the feature vectors attached to each node. One such instance is the magnetization of the generalized Potts model as shown by Equation F such that temporal proximity and feature similarity are taken into account.

The features that incorporate the syntactic, semantic and dynamical components of speech are then combined as a multi-dimensional features vector "F" that represents the speech sample. This feature vector is finally used to train a standard classifier according to Equation G to discriminate speech samples that belong to different conditions "C," such that for each test speech sample the classifier estimates its condition identity based on the extracted features represented by Equation H.

FIG. 8 depicts a diagram of graphical text analyzer 504A having a graphical text analysis circuit 802 according to one or more embodiments. Graphical text analyzer 504A is an implementation of graphical text analyzer module 504 (shown in FIG. 5). Graphical text analyzer 504A includes text input 820, a syntactic feature extractor 804, a semantic feature extractor 806, a graph constructor 808, a graph feature extractor 810, a hybrid graph circuit 812, a learning engine 814, a predictive engine 816 and an output circuit 818, configured and arranged as shown. In general, graphical text analysis circuit 802 functions to convert inputs from text input circuit 820 into hybrid graphs (e.g., word graph 600 shown in FIG. 6A), which is provided to learning engine 814 and predictive engine 816.

As noted, the graphical text analyzer circuit 802 provides word graph inputs to learning engine 814, and predictive engine 816, which constructs predictive features or model classifiers of the state of the individual in order to predict what the next state will be, i.e., the predicted behavioral or psychological category of output circuit 818. Accordingly, predictive engine 816 and output circuit 818 can be modeled as Markov chains.

Referring again to FIG. 5, user-A model 510 receives cognitive trait data from graphical text analyzer 504 and determines a model 510 of user-A based at least in part on the received cognitive trait data. User-A model 510 is, in effect, a profile of user-A that organizes and assembles the received cognitive trait data into a format suitable for use by decision engine 512. Optionally, the profile generated by user-A model 510 can be augmented by output from "other" analyzer 520, which provides analysis, other than graphical text analysis, of the input data 502 of user-A. For example, other analyzer 520 can track the specific interactions of user-A with other users in the environment 120 (shown in FIG. 1) such as gaze and eye movement interactions, such that user-A model 510 can match received cognitive trait data with specific interactions. The output of user-A model 510 is provided to decision engine 512, which analyzes the output of user-A model 510 to make a determination about the cognitive traits of user-A.

The cognitive trait assessment module 540 performs this analysis on all users in the environment 120 (shown in FIG. 1) and makes the results of prior analyses available through current/historical user models 532 and current/historical user interactions 534, which can be provided to decision engine 512 for optional incorporation into the determination of user-A's cognitive state and/or user-A's cognitive model 510.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
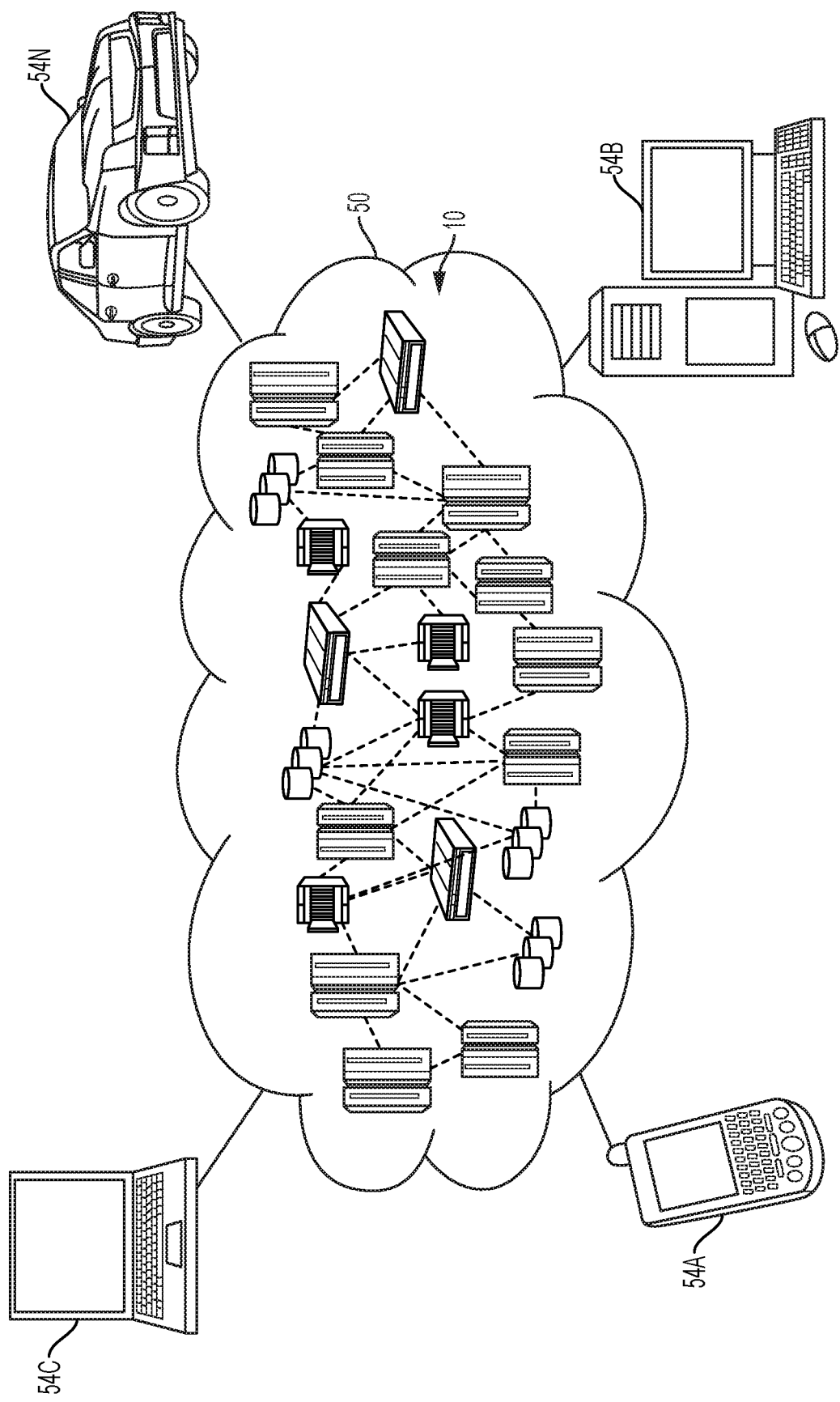
FIG. 9 depicts a cloud computing environment according to embodiments of the invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
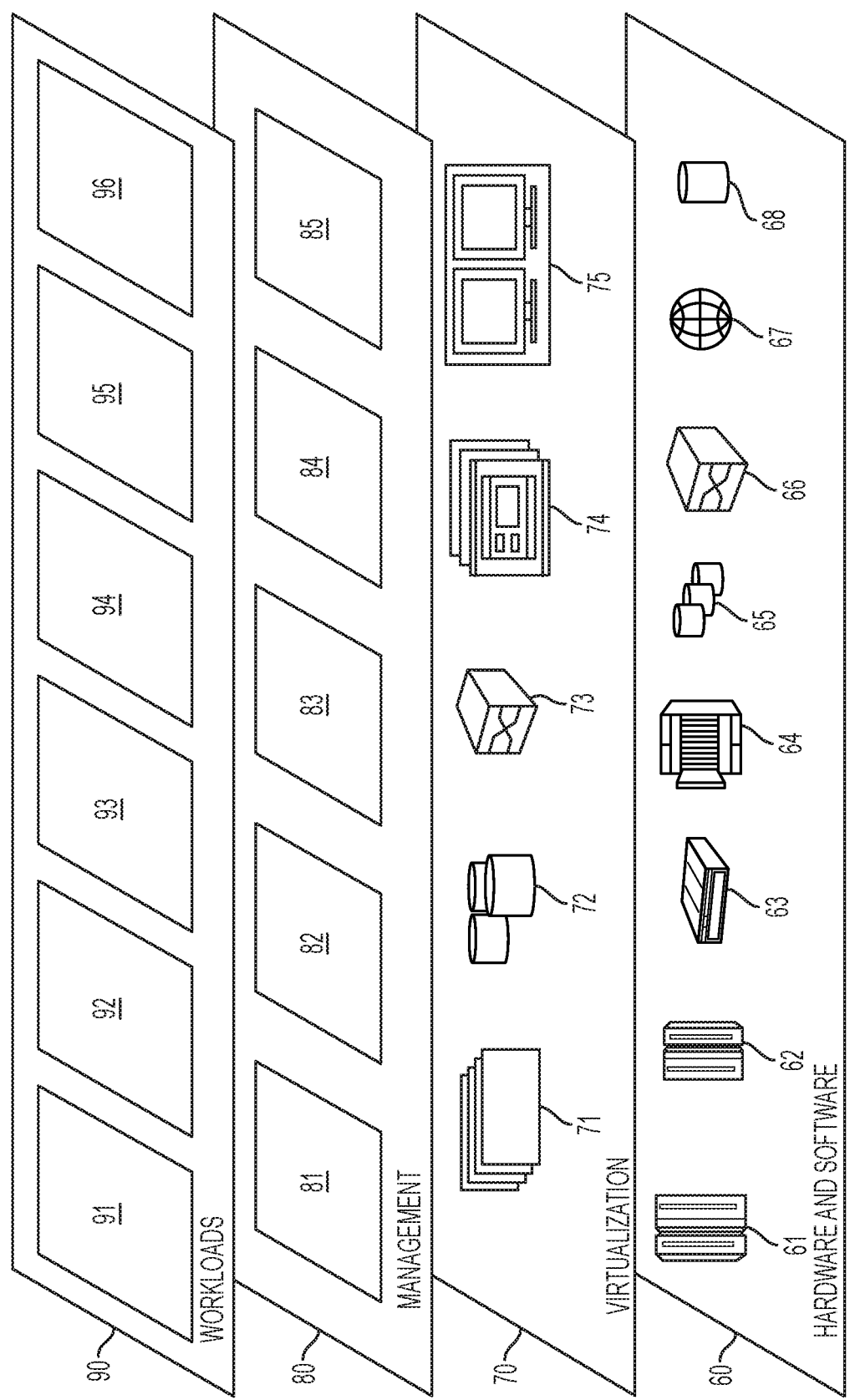
FIG. 10 depicts abstraction model layers according to an embodiment of the invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the cognitive triggering of human interactions configured to facilitate collaboration, productivity, and learning 96.

Figure 11:
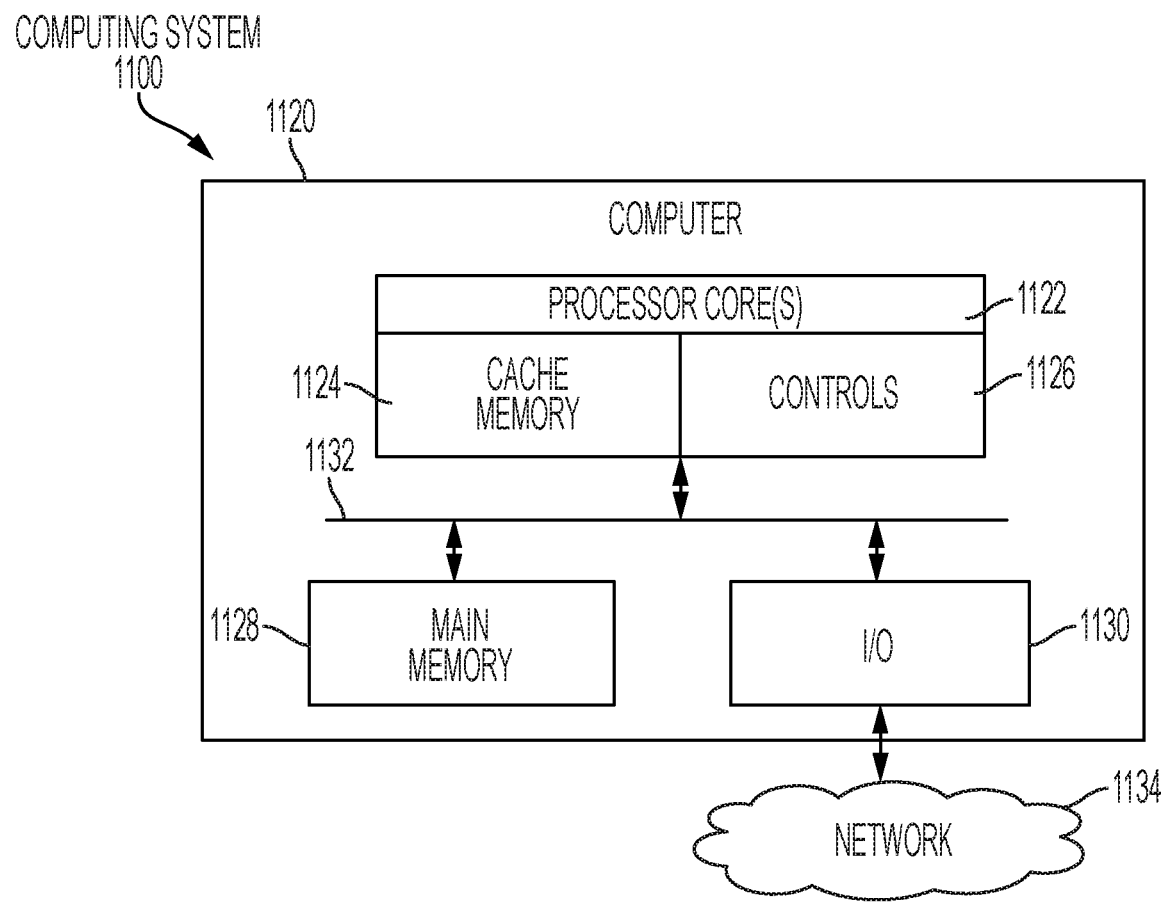
FIG. 11 depicts an exemplary computing system capable of implementing aspects of the invention.

FIG. 11 illustrates an example of a computer system 1100 that can be used to implement any of the computer-based components of the various embodiments of the invention described herein. The computer system 1100 includes an exemplary computing device ("computer") 1102 configured for performing various aspects of the content-based semantic monitoring operations described herein in accordance aspects of the invention. In addition to computer 1102, exemplary computer system 1100 includes network 1114, which connects computer 1102 to additional systems (not depicted) and can include one or more wide area networks (WANs) and/or local area networks (LANs) such as the Internet, intranet(s), and/or wireless communication network(s). Computer 1102 and additional system are in communication via network 1114, e.g., to communicate data between them.

Exemplary computer 1102 includes processor cores 1104, main memory ("memory") 1110, and input/output component(s) 1112, which are in communication via bus 1103. Processor cores 1104 includes cache memory ("cache") 1106 and controls 1108, which include branch prediction structures and associated search, hit, detect and update logic, which will be described in more detail below. Cache 1106 can include multiple cache levels (not depicted) that are on or off-chip from processor 1104. Memory 1110 can include various data stored therein, e.g., instructions, software, routines, etc., which, e.g., can be transferred to/from cache 1106 by controls 1108 for execution by processor 1104. Input/output component(s) 1112 can include one or more components that facilitate local and/or remote input/output operations to/from computer 1102, such as a display, keyboard, modem, network adapter, etc. (not depicted).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of triggering a dialogue system to implement human interaction strategies configured to facilitate human interactions between and among selected persons in an environment, the computer-implemented method comprising:
   receiving, at a triggering system, input data about the environment;
   using machine learning (ML) algorithms of the triggering system to extract features from the input data;
   using the ML algorithms of the triggering system to analyze relationships among and between the features extracted from the input data to generate a person-A user-interaction-readiness model for person-A in the environment, wherein the person-A user-interaction-readiness model comprises a model of person-A's readiness to participate in a human interaction with other persons in the environment;
   using the ML algorithms to apply real-world data about person-A to the person-A user-interaction-readiness model to generate a first classification output comprising data representing person-A's readiness to participate in a human interaction with other persons in the environment;
   using the ML algorithms of the triggering system to analyze relationships among and between the features extracted from the input data to generate a person-B user-interaction-readiness model for person-B in the environment, wherein the person-B user-interaction-readiness model comprises a model that indicates person-B's readiness to participate in a human interaction with another person in the environment;

using the ML algorithms to apply real-world data about person-B to the person-B user-interaction-readiness model to generate a second classification output comprising data representing person-B's readiness to participate in a human interaction with other persons in the environment;

using the ML algorithms of the triggering system to extract features from the input data, the first classification output, and the second classification output;

using the ML algorithms of the triggering system to analyze relationships among and between the features extracted from the input data, the first classification output, and the second classification output to generate a user-interaction-candidates group model for person-A and person-B in the environment, wherein the user-interaction-candidates group model comprises a model of person-A's and Person B's readiness to participate in a human interaction that includes person-A and person-B;

using the ML algorithms to apply real-world data about person-A and person-B to the user-interaction-candidates group model to generate a third classification output comprising data representing person-A's readiness to participate in a human interaction with person-B in the environment, as well as person-B's readiness to participate in a human interaction with person-A; and based at least in part on the third classification output, triggering the dialogue system to initiate the implementation of human interaction strategies configured to facilitate human interactions between person-A and person-B in the environment.

2. The computer-implemented method of claim 1 further comprising monitoring implementation of the human interaction strategies.

3. The computer-implemented method of claim 2 further comprising storing human interaction effectiveness data representing an effectiveness of the implementation of the human interaction strategies.

4. The computer-implemented method of claim 3 further comprising accessing the human interaction effectiveness data and using the ML algorithms of the triggering system to extract features from the human interaction effectiveness data.

5. The computer-implemented method of claim 4 further comprising using the ML algorithms of the triggering system to analyze relationships among and between the features extracted from the human interaction effectiveness data, the input data, the first classification output, and the second classification output to train the user-interaction-candidates group model for person-A and person-B in the environment.

6. The computer-implemented method of claim 1, wherein the input data comprise topics data comprising topics of potential interest to person-A and person-B.

7. The computer-implemented method of claim 1 further comprising:
using the ML algorithms of the triggering system to analyze relationships among and between the features extracted from the input data to generate a person-A cognitive trait model for person-A in the environment, wherein the person-A cognitive trait model comprises a model of person-A's cognitive traits;

using the ML algorithms to apply real-world data about person-A to the person-A cognitive trait model to generate a fourth classification output comprising data representing person-A's cognitive traits;

using the ML algorithms of the triggering system to analyze relationships among and between the features extracted from the input data to generate a person-B cognitive trait model for person-B in the environment, wherein the person-B cognitive trait model comprises a model of person-B's cognitive traits;

using the ML algorithms to apply real-world data about person-B to the person-B cognitive trait model to generate a fifth classification output comprising data representing person-B's cognitive traits;

using the ML algorithms of the triggering system to extract features from the fourth classification output and the fifth classification output; and using the ML algorithms of the triggering system to analyze relationships among and between the features extracted from the input data, the first classification output, the second classification output, the fourth classification output, and the fifth classification output to generate the user-interaction-candidates group model for person-A and person-B in the environment, wherein the user-interaction-candidates group model comprises a model of person-A's and Person B's readiness to participate in a human interaction that includes person-A and person-B.

8. A computer triggering system for triggering a dialogue system to implement human interaction strategies configured to facilitate human interactions between and among selected persons in an environment, the computer triggering system configure to perform operations comprising:
receiving input data about the environment;
using machine learning (ML) algorithms of the computer triggering system to extract features from the input data;

using the ML algorithms to analyze relationships among and between the features extracted from the input data to generate a person-A user-interaction-readiness model for person-A in the environment, wherein the person-A user-interaction-readiness model comprises a model of person-A's readiness to participate in a human interaction with other persons in the environment;

using the ML algorithms to apply real-world data about person-A to the person-A user-interaction-readiness model to generate a first classification output comprising data representing person-A's readiness to participate in a human interaction with other persons in the environment;

using the ML algorithms to analyze relationships among and between the features extracted from the input data to generate a person-B user-interaction-readiness model for person-B in the environment, wherein the person-B user-interaction-readiness model comprises a model that indicates person-B's readiness to participate in a human interaction with another person in the environment;

using the ML algorithms to apply real-world data about person-B to the person-B user-interaction-readiness model to generate a second classification output comprising data representing person-B's readiness to participate in a human interaction with other persons in the environment;

using the ML algorithms to extract features from the input data, the first classification output, and the second classification output;

using the ML algorithms to analyze relationships among and between the features extracted from the input data, the first classification output, and the second classification output to generate a user-interaction-candidates group model for person-A and person-B in the environment, wherein the user-interaction-candidates group model comprises a model of person-A's and Person B's readiness to participate in a human interaction that includes person-A and person-B;

using the ML algorithms to apply real-world data about person-A and person-B to the user-interaction-candidates group model to generate a third classification output comprising data representing person-A's readiness to participate in a human interaction with person-B in the environment, as well as person-B's readiness to participate in a human interaction with person-A; and based at least in part on the third classification output, triggering the dialogue system to initiate the implementation of human interaction strategies configured to facilitate human interactions between person-A and person-B in the environment.

9. The computer system of claim 8 further comprising monitoring implementation of the human interaction strategies.

10. The computer system of claim 9 further comprising storing human interaction effectiveness data representing an effectiveness of the implementation of the human interaction strategies.

11. The computer system of claim 10 further comprising accessing the human interaction effectiveness data and using the ML algorithms of the triggering system to extract features from the human interaction effectiveness data.

12. The computer system of claim 11 further comprising using the ML algorithms to analyze relationships among and between the features extracted from the human interaction effectiveness data, the input data, the first classification output, and the second classification output to train the user-interaction-candidates group model for person-A and person-B in the environment.

13. The computer system of claim 8, wherein the input data comprise topics data comprising topics of potential interest to person-A and person-B.

14. The computer system of claim 8 further comprising:
using the ML algorithms to analyze relationships among and between the features extracted from the input data to generate a person-A cognitive trait model for person-A in the environment, wherein the person-A cognitive trait model comprises a model of person-A's cognitive traits;
using the ML algorithms to apply real-world data about person-A to the person-A cognitive trait model to generate a fourth classification output comprising data representing person-A's cognitive traits;
using the ML algorithms to analyze relationships among and between the features extracted from the input data to generate a person-B cognitive trait model for person-B in the environment, wherein the person-B cognitive trait model comprises a model of person-B's cognitive traits;
using the ML algorithms to apply real-world data about person-B to the person-B cognitive trait model to generate a fifth classification output comprising data representing person-B's cognitive traits;
using the ML algorithms to extract features from the fourth classification output and the fifth classification output; and
using the ML algorithms to analyze relationships among and between the features extracted from the input data, the first classification output, the second classification output, the fourth classification output, and the fifth classification output to generate the user-interaction-candidates group model for person-A and person-B in the environment, wherein the user-interaction-candidates group model comprises a model of person-A's and Person B's readiness to participate in a human interaction that includes person-A and person-B.

15. A computer program product for triggering a dialogue system to implement human interaction strategies configured to facilitate human interactions between and among selected persons in an environment, the computer program product comprising a computer readable program stored on a computer readable storage medium, wherein the computer readable program, when executed on a processor, causes the processor to perform a method comprising:
receiving input data about the environment;
using machine learning (ML) algorithms of the processor to extract features from the input data;
using the ML algorithms to analyze relationships among and between the features extracted from the input data to generate a person-A user-interaction-readiness model for person-A in the environment, wherein the person-A user-interaction-readiness model comprises a model of person-A's readiness to participate in a human interaction with other persons in the environment;
using the ML algorithms to apply real-world data about person-A to the person-A user-interaction-readiness model to generate a first classification output comprising data representing person-A's readiness to participate in a human interaction with other persons in the environment;
using the ML algorithms to analyze relationships among and between the features extracted from the input data to generate a person-B user-interaction-readiness model for person-B in the environment, wherein the person-B user-interaction-readiness model comprises a model that indicates person-B's readiness to participate in a human interaction with another person in the environment;
using the ML algorithms to apply real-world data about person-B to the person-B user-interaction-readiness model to generate a second classification output comprising data representing person-B's readiness to participate in a human interaction with other persons in the environment;
using the ML algorithms to extract features from the input data, the first classification output, and the second classification output;
using the ML algorithms to analyze relationships among and between the features extracted from the input data, the first classification output, and the second classification output to generate a user-interaction-candidates group model for person-A and person-B in the environment, wherein the user-interaction-candidates group model comprises a model of person-A's and Person B's readiness to participate in a human interaction that includes person-A and person-B;
using the ML algorithms to apply real-world data about person-A and person-B to the user-interaction-candidates group model to generate a third classification output comprising data representing person-A's readiness to participate in a human interaction with person-B in the environment, as well as person-B's readiness to participate in a human interaction with person-A; and
based at least in part on the third classification output, triggering the dialogue system to initiate the implementation of human interaction strategies configured to facilitate human interactions between person-A and person-B in the environment.

16. The computer program product of claim 15, wherein the method performed by the processor further comprises:
   monitoring implementation of the human interaction strategies; and
   storing human interaction effectiveness data representing an effectiveness of the implementation of the human interaction strategies.

17. The computer program product of claim 16, wherein the method performed by the processor further comprises accessing the human interaction effectiveness data and using the ML algorithms of the triggering system to extract features from the human interaction effectiveness data.

18. The computer program product of claim 17, wherein the method performed by the processor further comprises using the ML algorithms to analyze relationships among and between the features extracted from the human interaction effectiveness data, the input data, the first classification output, and the second classification output to train the user-interaction-candidates group model for person-A and person-B in the environment.

19. The computer program product of claim 15, wherein the input data comprise topics data comprising topics of potential interest to person-A and person-B.

20. The computer program product of claim 15, wherein the method performed by the processor further comprises:
   using the ML algorithms to analyze relationships among and between the features extracted from the input data to generate a person-A cognitive trait model for person-A in the environment, wherein the person-A cognitive trait model comprises a model of person-A's cognitive traits;
   using the ML algorithms to apply real-world data about person-A to the person-A cognitive trait model to generate a fourth classification output comprising data representing person-A's cognitive traits;
   using the ML algorithms to analyze relationships among and between the features extracted from the input data to generate a person-B cognitive trait model for person-B in the environment, wherein the person-B cognitive trait model comprises a model of person-B's cognitive traits;
   using the ML algorithms to apply real-world data about person-B to the person-B cognitive trait model to generate a fifth classification output comprising data representing person-B's cognitive traits;
   using the ML algorithms to extract features from the fourth classification output and the fifth classification output; and
   using the ML algorithms to analyze relationships among and between the features extracted from the input data, the first classification output, the second classification output, the fourth classification output, and the fifth classification output to generate the user-interaction-candidates group model for person-A and person-B in the environment, wherein the user-interaction-candidates group model comprises a model of person-A's and Person B's readiness to participate in a human interaction that includes person-A and person-B.

* * * * *